(12) United States Patent
Nishido

(10) Patent No.: US 8,181,875 B2
(45) Date of Patent: May 22, 2012

(54) RFID TAG AND DRIVING METHOD THEREOF

(75) Inventor: Yusuke Nishido, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 232 days.

(21) Appl. No.: 12/572,766

(22) Filed: Oct. 2, 2009

(65) Prior Publication Data

US 2010/0084467 A1 Apr. 8, 2010

(30) Foreign Application Priority Data

Oct. 3, 2008 (JP) ................................. 2008-258283

(51) Int. Cl.
*G06K 7/08* (2006.01)
*G06K 19/06* (2006.01)

(52) U.S. Cl. .... 235/451; 235/492; 340/10.1; 340/572.1; 340/572.2

(58) Field of Classification Search .................. 235/375, 235/380, 451, 487, 492, 486; 340/10.1, 572.1, 340/572.2
See application file for complete search history.

(56) References Cited

U.S. PATENT DOCUMENTS

| | | | |
|---|---|---|---|
| 5,736,728 | A | 4/1998 | Matsubara |
| 6,097,292 | A | 8/2000 | Kelly et al. |
| 6,427,065 | B1 | 7/2002 | Suga et al. |
| 6,799,015 | B1 | 9/2004 | Tiwari |
| 6,879,809 | B1 | 4/2005 | Vega et al. |
| 2005/0122651 | A1 | 6/2005 | Fischer et al. |
| 2005/0161508 | A1 | 7/2005 | Akaida et al. |
| 2005/0280509 | A1 | 12/2005 | Tanaka et al. |
| 2005/0282505 | A1 | 12/2005 | Umeda et al. |
| 2006/0116968 | A1 | 6/2006 | Arisawa |
| 2006/0128345 | A1 | 6/2006 | Ootaka et al. |
| 2006/0133545 | A1 | 6/2006 | Kunc et al. |
| 2006/0164215 | A1 | 7/2006 | Kofler |
| 2006/0273902 | A1 * | 12/2006 | Shafer et al. ............... 340/572.1 |
| 2007/0007342 | A1 * | 1/2007 | Cleeves et al. ................ 235/435 |
| 2007/0013486 | A1 * | 1/2007 | Yeoh et al. .................. 340/10.34 |
| 2007/0080374 | A1 | 4/2007 | Kurokawa |
| 2007/0236851 | A1 * | 10/2007 | Shameli et al. ............... 361/113 |
| 2008/0055082 | A1 * | 3/2008 | Savry et al. ................ 340/568.1 |
| 2008/0094027 | A1 | 4/2008 | Cho |
| 2008/0094180 | A1 | 4/2008 | Kato et al. |
| 2008/0143531 | A1 | 6/2008 | Tadokoro |
| 2008/0150475 | A1 | 6/2008 | Kato et al. |
| 2008/0158926 | A1 | 7/2008 | Umeda et al. |
| 2008/0174408 | A1 | 7/2008 | Takahashi |
| 2008/0311850 | A1 | 12/2008 | Ootaka et al. |
| 2008/0318523 | A1 | 12/2008 | Umeda et al. |
| 2009/0058601 | A1 * | 3/2009 | Balachandran et al. ..... 340/10.1 |

FOREIGN PATENT DOCUMENTS

| | | |
|---|---|---|
| JP | 2002-176141 | 6/2002 |
| JP | 2002-368647 | 12/2002 |
| JP | 2006-5651 | 1/2006 |
| JP | 2006-180073 | 7/2006 |
| JP | 2007-183790 | 7/2007 |
| WO | WO 2006/101285 A1 | 9/2006 |

* cited by examiner

*Primary Examiner* — Tuyen K Vo
(74) *Attorney, Agent, or Firm* — Husch Blackwell LLP

(57) ABSTRACT

The wireless tag includes a circuit which receives an AC signal from the outside and detects an envelope, a detection circuit which detects the level of electric power supplied from the outside and outputs a potential corresponding to the detected electric power, a protection circuit which changes an impedance of a circuit receiving the electric power in accordance with the electric power output from the detection circuit, a selection circuit portion which selects whether the electric power output from the detection circuit is input to the protection circuit.

8 Claims, 10 Drawing Sheets

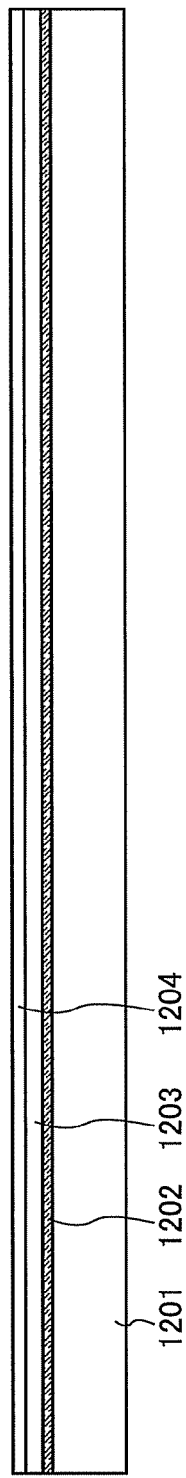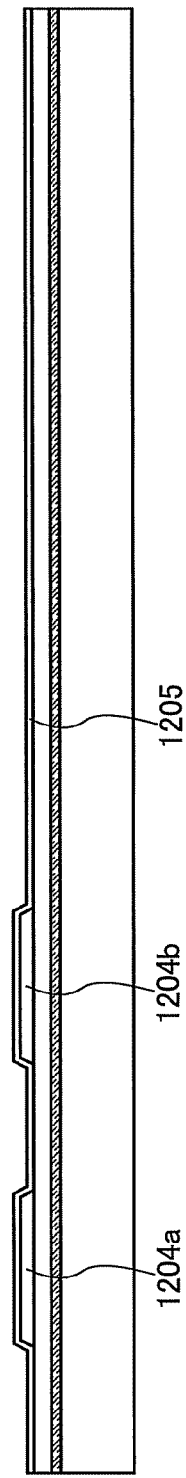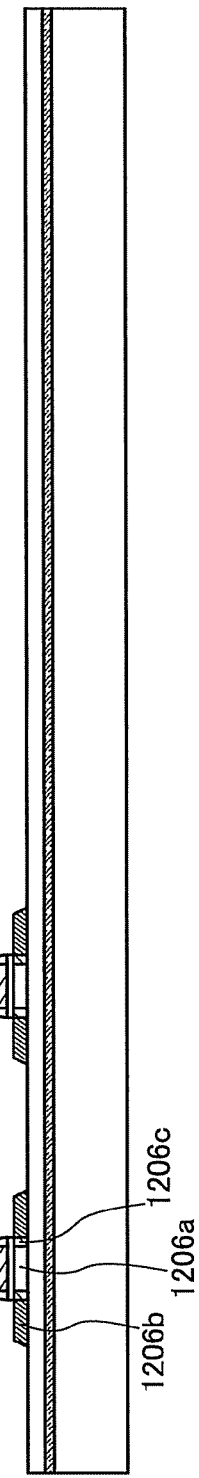

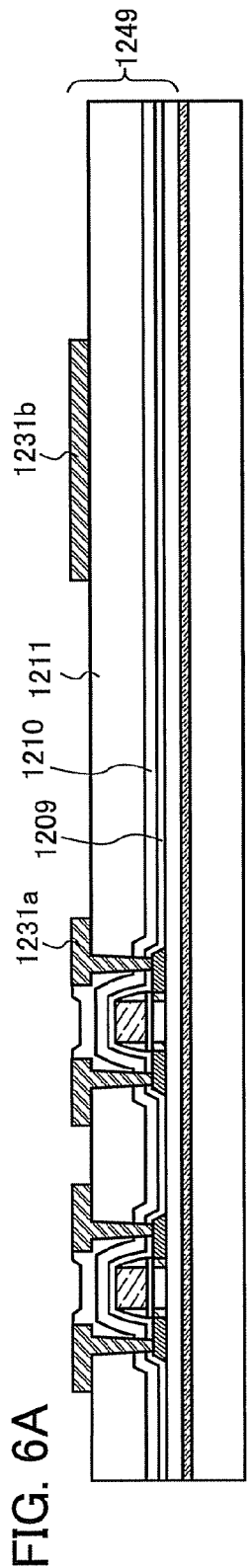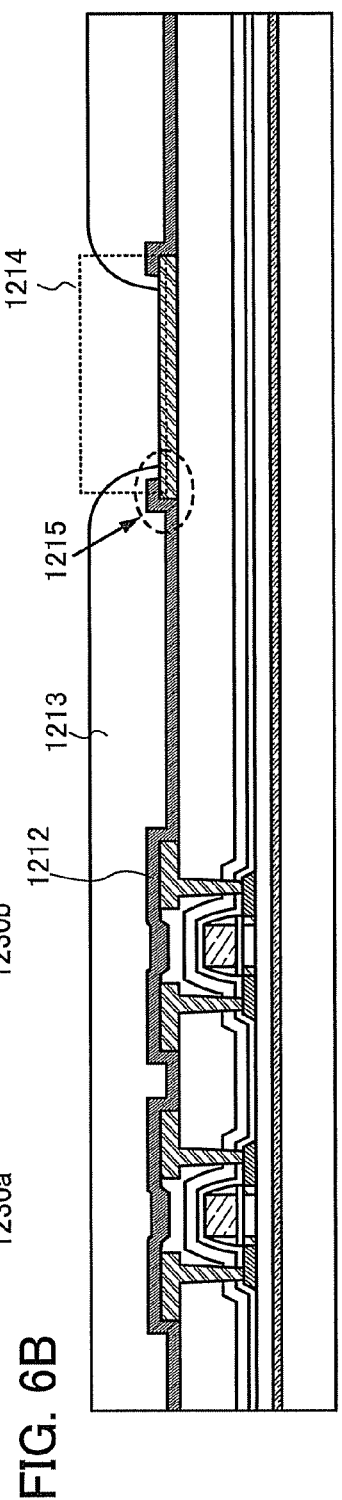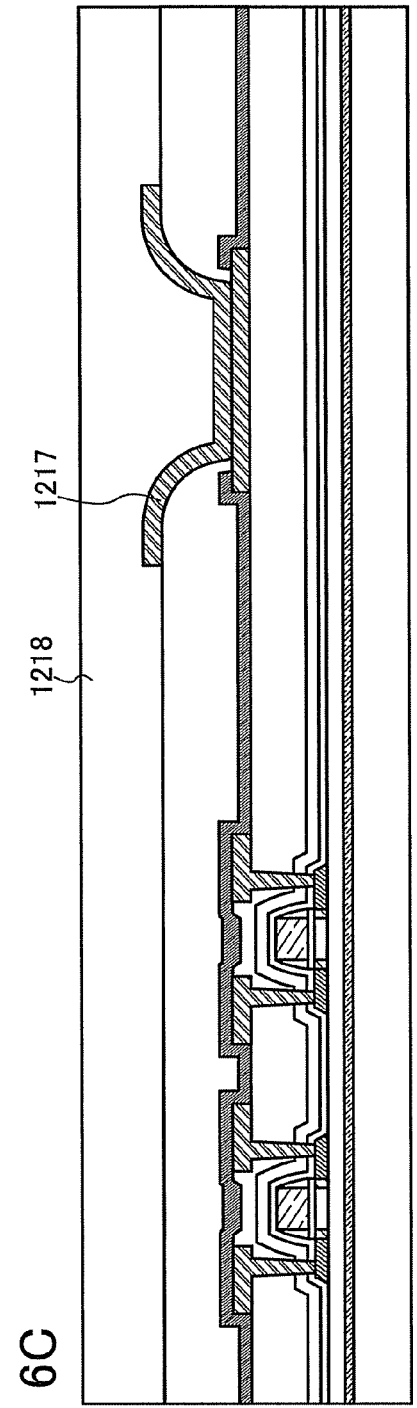

801

802

803

804

805

806

RFID TAG AND DRIVING METHOD THEREOF

BACKGROUND OF THE INVENTION

1. Field of the Invention

The present invention relates to a semiconductor device, that is, an RFID tag, which transmits and receives data by wireless communication. In particular, the present invention relates to a protection circuit which prevents a wireless communication circuit from being damaged or prevents elements provided in the circuit from deteriorating and being damaged when the RFID tag receives a signal having excessive electric power in wireless communication.

2. Description of the Related Art

In recent years, an individual identification technology using wireless communication (hereinafter referred to as a wireless communication system) has attracted attention. In particular, a wireless communication system in which a tag utilizing an RFID (radio frequency identification) technology (hereinafter referred to as an RFID tag regardless of its shape such as a card shape or a chip shape) is used as a data carrier which transmits and receives data by wireless communication has attracted attention. An RFID tag is also referred to as an IC tag, a wireless tag, or an electronic tag.

In the field of manufacture and distribution, a wireless communication system with an RFID tag is utilized for management of a large number of items and the like instead of conventional management with a bar code, and is applied for individual identification.

Here, a wireless communication system refers to a communication system in which data is transmitted and received wirelessly between a transmitter receiver (also referred to as an interrogator), such as a reader/writer (hereinafter referred to as a R/W), and an RFID tag. In such a wireless communication system, data which is to be transmitted and received is superimposed on carrier waves emitted from the R/W.

The RFID tag is categorized into an active-type and a passive-type. A passive RFID tag does not include a battery. Drive electric power for a circuit in an RFID tag is supplied by generating DC voltage for drive in the RFID tag from a carrier wave emitted from a R/W or from an amplitude-modulated wave generated by superimposing a modulated wave on a carrier wave. On the other hand, an active RFID tag includes a battery for supplying electric power which allows the battery to operate.

A passive RFID tag can be made smaller and lighter because it does not include a battery; however, the passive-type RFID tag cannot generate electric power for circuit operation when it receives less carrier waves than required because it generates drive electric power by receiving a carrier wave emitted from a R/W.

Such a wireless communication system needs to satisfy the following conditions: the long maximum communication distance and recognition of all the RFID tags when a number of RFID tags are provided in a particular area.

Both of the conditions can be satisfied by increasing electric power in a carrier wave from a R/W. Therefore, in the case where an RFID tag is provided in the close vicinity of the R/W or in the case where a small number of RFID tags are provided in the vicinity of the R/W, the RFID tag receives a signal having quite high electric power.

When an RFID tag receives a signal having excessive electric power, a DC voltage generated in the RFID tag also becomes excess. When high voltage is applied to an internal circuit in the RFID tag, elements included in the internal circuit are damaged. Therefore, in an RFID tag used for a wireless communication system in which a carrier wave from a R/W has high electric power, a protection circuit is provided so that excessive electric power is not generated in the tag in the case where the RFID tag is in circumstances where the RFID tag receives a signal having excessive electric power (see Patent Document 1 and Patent Document 2).

PATENT DOCUMENT

[Patent Document 1] Japanese Published Patent Application No. 2006-180073
[Patent Document 2] Japanese Published Patent Application No. 2007-183790

However, as well as a carrier wave, the above amplitude-modulated wave is also transmitted from a R/W. The amplitude-modulated wave is modulated by a superimposed signal; thus, the amplitude of the amplitude-modulated wave is not fixed. Therefore, electric power received by an antenna of an RFID tag fluctuates all the time. Thus, a DC voltage generated by rectifying a carrier wave or an amplitude-modulated wave in the RFID tag also fluctuates all the time.

In the case where the above fluctuation occurs around a threshold of an operation starting voltage of a protection circuit, the protection circuit repeats a start movement and a stop movement in accordance with the fluctuation of potential, which causes noise in the RFID tag or an unstable power supply voltage in the RFID tag.

SUMMARY OF THE INVENTION

In order to solve the aforementioned problems, in one embodiment of the present invention, a protection circuit (also referred to as a voltage limiter circuit) which operates stably even if a communication distance or communication environment between an RFID tag and a R/W changes, or even if a power supply potential generated in the RFID tag fluctuates when the RFID tag receives an amplitude-modulated wave is provided and communication quality is improved.

In order to solve the above problems, the following methods are taken in one embodiment of the present invention.

An RFID tag according to one embodiment of the present invention includes the following circuits: an antenna circuit which transmits and receives AC signal, a rectifier circuit which generates DC voltage from the AC signal, a logic circuit which is driven by the DC voltage, an envelope detection circuit which detects an envelope from the AC signal, a comparator circuit which detects a potential difference between the DC voltage and reference voltage and outputs a potential corresponding to the potential difference, a protection circuit portion which changes an impedance of the antenna circuit corresponding to the potential; and a selection circuit portion which is controlled by the envelope and selects whether or not the potential output from the comparator circuit is input to the protection circuit portion.

An RFID tag according to one embodiment of the present invention includes the following circuits: an antenna circuit which transmits and receives AC signal, a rectifier circuit which generates DC voltage from the AC signal, a logic circuit which is driven by the DC voltage, an envelope detection circuit which detects an envelope from the AC signal, a buffer circuit which shapes the envelope and outputs a pulse signal, a comparator circuit which detects a potential difference between the DC voltage and reference voltage and outputs a potential corresponding to the potential difference, a protection circuit portion which changes the impedance of the antenna circuit, and a selection circuit portion which is controlled by the pulse signal and selects whether or not the potential output from the comparator circuit is input to the protection circuit portion.

The protection circuit portion may have a capacitor for changing the impedance of a circuit which receives the AC signal or have a resistor for changing the impedance of the circuit which receives the AC signal.

A driving method of an RFID tag according to one embodiment of the present invention includes the following steps: a step of receiving an AC signal by an antenna circuit, a step of generating DC voltage by shaping the AC signal, a step of driving a logic circuit by the DC voltage, a step of detecting an envelope from the AC signal, a step of detecting a potential difference between the DC voltage and reference voltage and outputting a potential corresponding to the potential difference, and a step of changing the impedance of the antenna circuit by the potential controlled by the envelope.

A driving method of an RFID tag according to one embodiment of the present invention includes the following steps: a step of receiving AC voltage by an antenna circuit, a step of generating DC voltage by shaping the AC signal, a step of driving a logic circuit by the DC voltage, a step of detecting an envelope from the AC signal, a step of shaping the envelope and generating a pulse signal, a step of detecting a potential difference between the DC voltage and reference voltage and outputting a potential corresponding to the potential difference, and a step of changing the impedance of the antenna circuit by the potential controlled by the pulse signal.

In an RFID tag according to one embodiment of the present invention and a driving method thereof, start and stop of an operation of a protection circuit is controlled depending on the level of the DC voltage generated by rectifying a carrier wave or an amplitude-modulated wave received by an antenna, and start and stop of the operation of a protection circuit can be controlled using a control signal generated in accordance with a signal obtained by the envelope detection. In other words, start and stop of an operation of the protection circuit is controlled with the use of amplitude fluctuation itself in the amplitude-modulated wave which is a factor of a fluctuation in power supply potential; therefore, the factor of the unstable operation can be effectively removed.

BRIEF DESCRIPTION OF THE DRAWINGS

FIGS. 5A to 5C are diagrams showing an example of a manufacturing process of an RFID tag.

FIGS. 6A to 6C are diagrams showing an example of the manufacturing process of an RFID) tag.

DETAILED DESCRIPTION OF THE INVENTION

Figure 1:
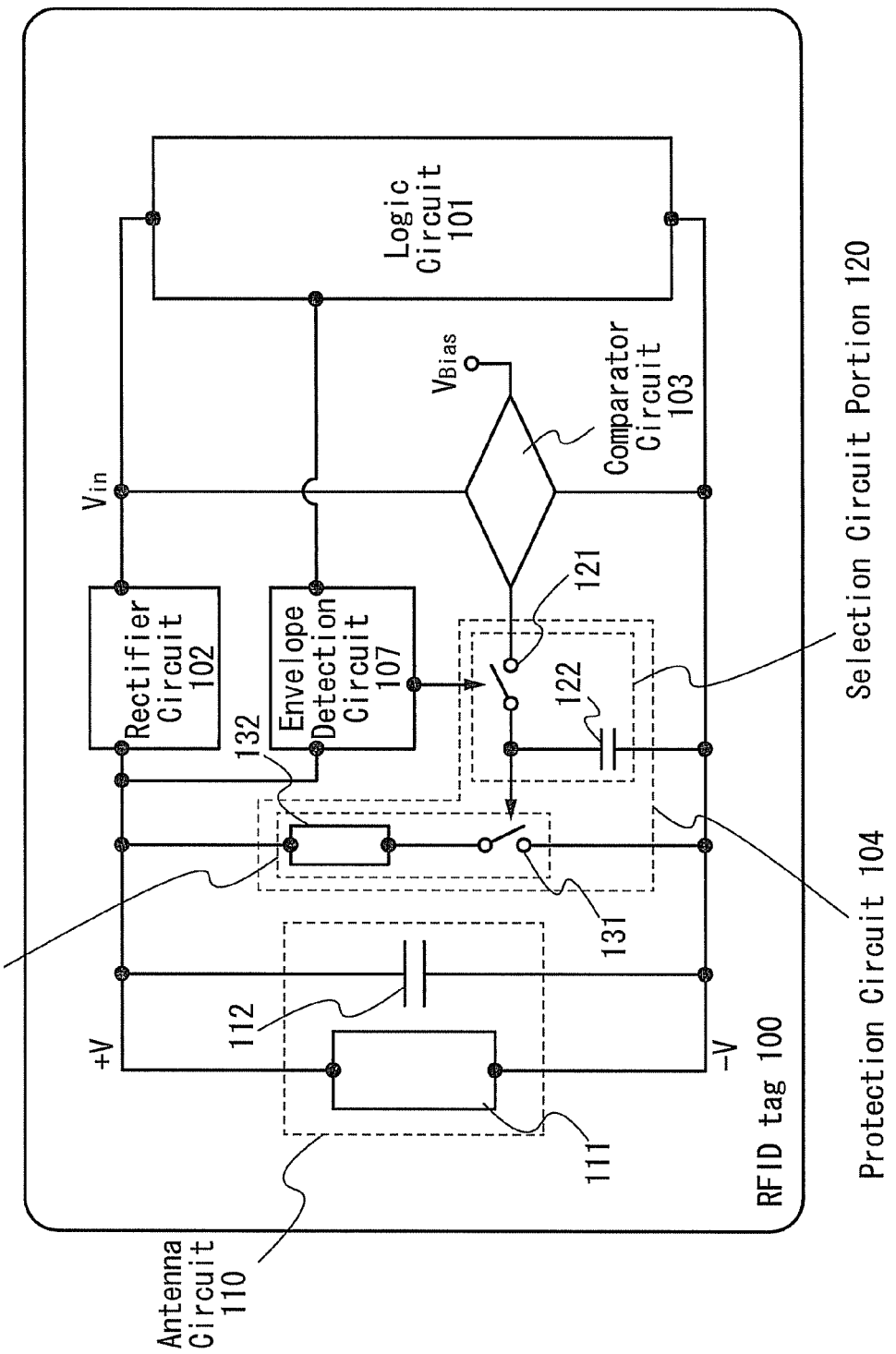
FIG. 1 is a diagram showing a structure example of an RFID tag including a protection circuit according to one embodiment of the present invention.

Embodiments of the present invention will be described in detail below with reference to the drawings. Note that the present invention is not limited to the description below, and it is easily understood by those skilled in the art that various changes and modifications can be made without departing from the spirit and scope of the present invention. Therefore, the present invention should not be interpreted as being limited to the description of the embodiments described below. In the structure of the present invention described below, the same reference numerals are commonly given to the same components or components having similar functions in different drawings, and repetitive description will be omitted.

Embodiment 1

An RFID tag 100 includes a logic circuit 101, a rectifier circuit 102, a comparator circuit 103, a protection circuit 104, an envelope detection circuit 107, and an antenna circuit 110 (see FIG. 1). The protection circuit 104 includes a selection circuit portion 120 which has a switch (also referred to as a transistor) 121 and a capacitor 122, and a protection circuit portion 130 which has a switch (also referred to as a transistor) 131 and a load 132.

The antenna circuit 110 receives a carrier wave or an amplitude-modulated wave which are output from a R/W, or the antenna circuit 110 superimposes a response signal from the RFID tag 100 on a carrier wave output from the R/W to generate an amplitude-modulated wave and transmits the amplitude-modulated wave. A frequency band of a carrier wave or a frequency band of an amplitude-modulated wave, which allows the antenna circuit 110 to transmit and receive in a most effective way, depends on the impedance determined by the antenna 111 and the capacitor 112.

The rectifier circuit 102 rectifies a carrier wave or an amplitude-modulated wave received in the antenna circuit 110 and obtains DC voltage $V_{in}$. Although not particularly shown in FIG. 1, a regulator or the like may be provided to stabilize the DC voltage $V_{in}$ output from the rectifier circuit 102.

The envelope detection circuit 107 detects an envelope of the amplitude-modulated wave received in the antenna circuit 110. Although not particularly shown in FIG. 1, a demodulation circuit which shapes an envelope and extracts a command signal from the R/W as a pulse signal may be provided. For example, when envelope detection is performed on an amplitude-modulated wave, a low-level signal can be extracted from a small-amplitude wave and a high-level signal can be extracted from a large-amplitude wave.

Figure 4A:
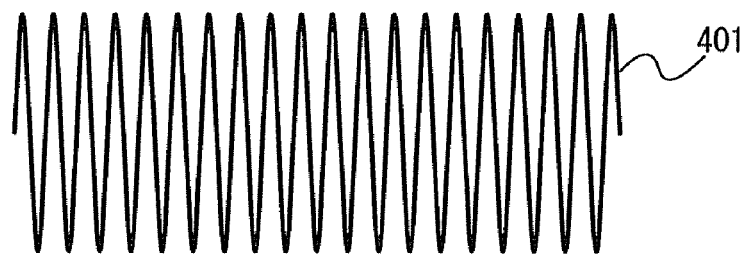
FIGS. 4A to 4D are diagrams showing a carrier wave, an amplitude-modulated wave, and envelope detection.
Figure 4B:
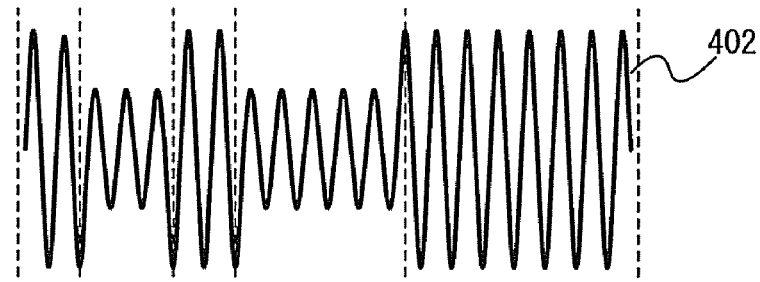

Description is simply made with reference to FIGS. 4A to 4D. The RFID tag 100 transmits and receives a signal by superimposing a command signal or a response signal on a carrier wave in the case of communication with a R/W. As shown in FIG. 4A, a carrier wave 401 has is an AC wave which has a predetermined amplitude and is oscillated with predetermined frequency, and a frequency band of the carrier wave 401 varies depending on the communication standard. In order to superimpose a command signal or response signal on the carrier wave 401, an amplitude-modulated wave 402 is made by modulating the amplitude of the carrier wave 401 as shown in FIG. 4B. For example, a large-amplitude portion indicates a high level in a command signal or a response signal and a small-amplitude portion indicates a low level in a command signal or a response signal.

Figure 4C:
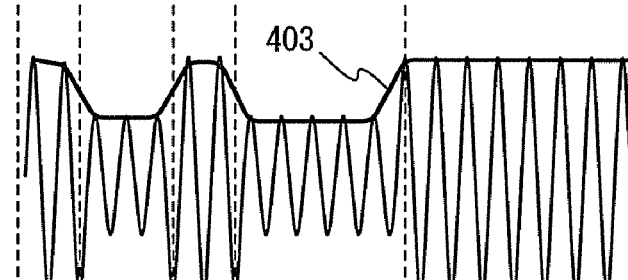
Figure 4D:
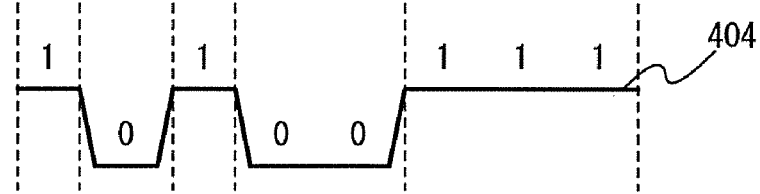

Envelope detection is explained. When the RFID tag 100 receives the amplitude-modulated wave 402 on which a command signal is superimposed, the envelope detection circuit 107 extracts an envelope 403 from the amplitude-modulated wave 402 as a tangent to each vertex of amplitudes (FIG. 4C). Although the envelope 403 has distortion in the waveform, the envelope 403 is shaped so as to be a pulsed signal 404 which indicates a high level (1) and a low level (0) as shown in FIG. 4D.

The command signal from the R/W, which is output from the envelope detection circuit 107 or the demodulation circuit, is input to the logic circuit 101, and the logic circuit 101 outputs a response signal in accordance with the command. Although not particularly shown in FIG. 1, the RFID tag 100 responds to the R/W by modulating a carrier wave output from the R/W in a modulation circuit with the response signal output from the logic circuit 101 to generate an amplitude-modulated wave and by outputting the amplitude-modulated wave through the antenna circuit 110.

The comparator circuit 103 monitors a potential difference between a −V terminal and $V_{in}$ generated by the rectifier circuit 102. The comparator circuit 103 compares a potential of $V_{in}$ with a voltage defined by the comparator circuit 103 and outputs a signal which turns on the switch 131 included in the protection circuit 104 when the potential of the $V_{in}$ exceeds a threshold voltage. On the other hand, when the potential of the $V_{in}$ falls below the threshold voltage, the comparator circuit 103 outputs a signal which turns off the switch 131 included in the protection circuit 104.

The protection circuit portion 130 has the load 132 which changes an input impedance of the antenna circuit 110 between the switch 131 and a +V terminal. The load 132 may be provided between the switch 131 and the −V terminal. Note that in the case where change in the input impedance of the antenna circuit 110 can be used for parasitic capacitance or the like of the switch 131, the load 132 is not necessarily provided.

In FIG. 1, it is assumed that the input impedance of the antenna circuit 110 is Z1 in the case where the protection circuit 104 does not operate. When the switch 131 is turned on and the protection circuit 104 operates, impedance Z2 generated by the switch 131 and the load 132 included in the protection circuit portion 130 is added; thus combined impedance Z is expressed as follows: $Z=\{(1/Z1)+(1/Z2)\}^{-1}$.

Since impedance matching between the R/W and the antenna circuit 110 changes when the input impedance of the antenna circuit 110 changes in accordance with the operation of the protection circuit 104 as described above, electric power received by the antenna circuit 110 is decreased. Accordingly, a DC voltage generated by the rectifier circuit 102 is also decreased, so that application of overvoltage to the RFID tag is prevented.

As a feature of one embodiment of the present invention, the selection circuit portion 120 is provided in a path through which the comparator circuit 103 outputs a signal for controlling on/off of the switch 131, that is, the selection circuit portion 120 is provided between the comparator circuit 103 and the switch 131. The selection circuit portion 120 controls the switch 121 based on a signal detected by the envelope detection circuit 107 as described above. Specifically, when the selection circuit portion 120 receives an amplitude-modulated wave having large amplitude, the envelope detection circuit 107 outputs a high-level signal, and in this case, the signal is output so that the switch 121 is turned on. On the other hand, when the selection circuit portion 120 receives an amplitude-modulated wave having small amplitude, the envelope detection circuit 107 outputs a low-level signal, and in this case, the signal is output so that the switch 121 is turned off.

When the switch 121 is turned off, that is, when the amplitude of the amplitude-modulated wave is decreased and the level of a DC voltage output by the rectifier circuit 102 starts to decrease, the level of the DC voltage changes to a near level of operation starting voltage of the protection circuit 104 as described above. Therefore, the comparator circuit 103 fluctuates between a state of outputting a signal for turning on the switch 131 and a state of outputting a signal for turning off the switch 131. However, the fluctuation of the signal output does not directly affect to the switch 131 by turning off the switch 121; thus, the protection circuit portion 130 does not perform unstable operation. In this case, an electric charge of the signal output from the comparator circuit 103 is held in the capacitor 122 before the switch 121 is turned off, so that a gate potential of the switch 131 is held by the electric charge while the capacitor 122 is holding the electric charge.

In the case where the level of the DC voltage output from the rectifier circuit 102 changes to a near level of the operation starting voltage of the protection circuit 104, in a conventional method, the protection circuit 104 repeats a start movement and a stop movement in accordance with the fluctuation, which causes troubles such as noise or unstable power supply voltage. However, according to one embodiment of the present invention, the protection circuit 104 in such a voltage range can be operated more stably. Therefore, in circumstances where high electric power is received, application of overvoltage to the circuit in the RFID tag 100 is favorably prevented by the operation of the protection circuit 104, and the protection circuit 104 stably operates. Accordingly, a stable communication operation is realized.

Note that in this embodiment, although the switch 121 included in the selection circuit portion 120 is controlled with an output signal from the envelope detection circuit 107, the switch 121 may be controlled with a pulsed signal obtained through a buffer as described with reference to FIG. 4A to 4D.

Embodiment 2

The details of the structure described in Embodiment 1 are described with reference to FIG. 2.

The rectifier circuit 102 is a half-wave voltage doubler rectifier circuit including diode-connected transistors 201 and 202 and capacitors 203 and 204. The capacitor 204 is a smoothing capacitor, which relieves an output fluctuation of the rectifier circuit, or a potential fluctuation of $V_{in}$, due to change in consumption current of the logic circuit 101 which is a load in a subsequent stage.

A transistor is used as the switch 121 in a selection circuit portion 120. Further, a transistor is used as the switch 131 in the protection circuit portion 130. An example in which a capacitor 132 is used as a load for changing impedance is shown.

The comparator circuit 103 includes a resistor 211, diode-connected transistors 212 to 215, and transistors 216 and 217. The diode-connected transistors 212 to 215 are off when a potential difference between $V_{in}$ and −V is not large because each of the diode-connected transistors 212 to 215 has threshold voltage; thus, no potential difference is generated between terminals of the resistor 211. Accordingly, the transistor 216 is off. Meanwhile, a potential divided by the transistor 216 and the transistor 217 is input to a gate of the transistor 131 in the protection circuit portion 130 through the selection circuit portion 120, but when the transistor 216 is off, a low-level potential, i.e., a potential which is substantially the same as a potential of the −V terminal is input to the gate of the transistor 131, so that the transistor is turned off.

With gradual increase in the potential difference between the $V_{in}$ and the −V terminal, the diode-connected transistors 212 to 215 are turned on, and a potential difference is generated between the terminals of the resistor 211. The potential difference generated between the terminals of the resistor 211 corresponds to gate-source voltage of the transistor 216, and when the potential difference generated between the terminals of the resistor 211 exceeds an absolute value of threshold voltage of the transistor 216, the transistor 216 is gradually turned on. Accordingly, the potential divided by the transistor 216 and the transistor 217 increases, and when the transistor 131 is turned on, the input impedance of an antenna circuit 110 is changed by the protection circuit portion 130.

The transistor 121 in the selection circuit portion 120 is controlled by an output from the envelope detection circuit 107, and as described above, when the amplitude of an amplitude-modulated wave is small, the envelope detection circuit 107 outputs a low-level signal and turns off the transistor 121. Thus, a path through which the potential divided by the transistor 216 and the transistor 217 is input to the transistor 131 is blocked, and the gate potential of the transistor 131 is held by electric charge accumulated in the capacitor 122. Note that although the envelope detection circuit 107 is not specifically shown in the figure, an existing detection circuit or demodulation circuit is used.

Figure 2:
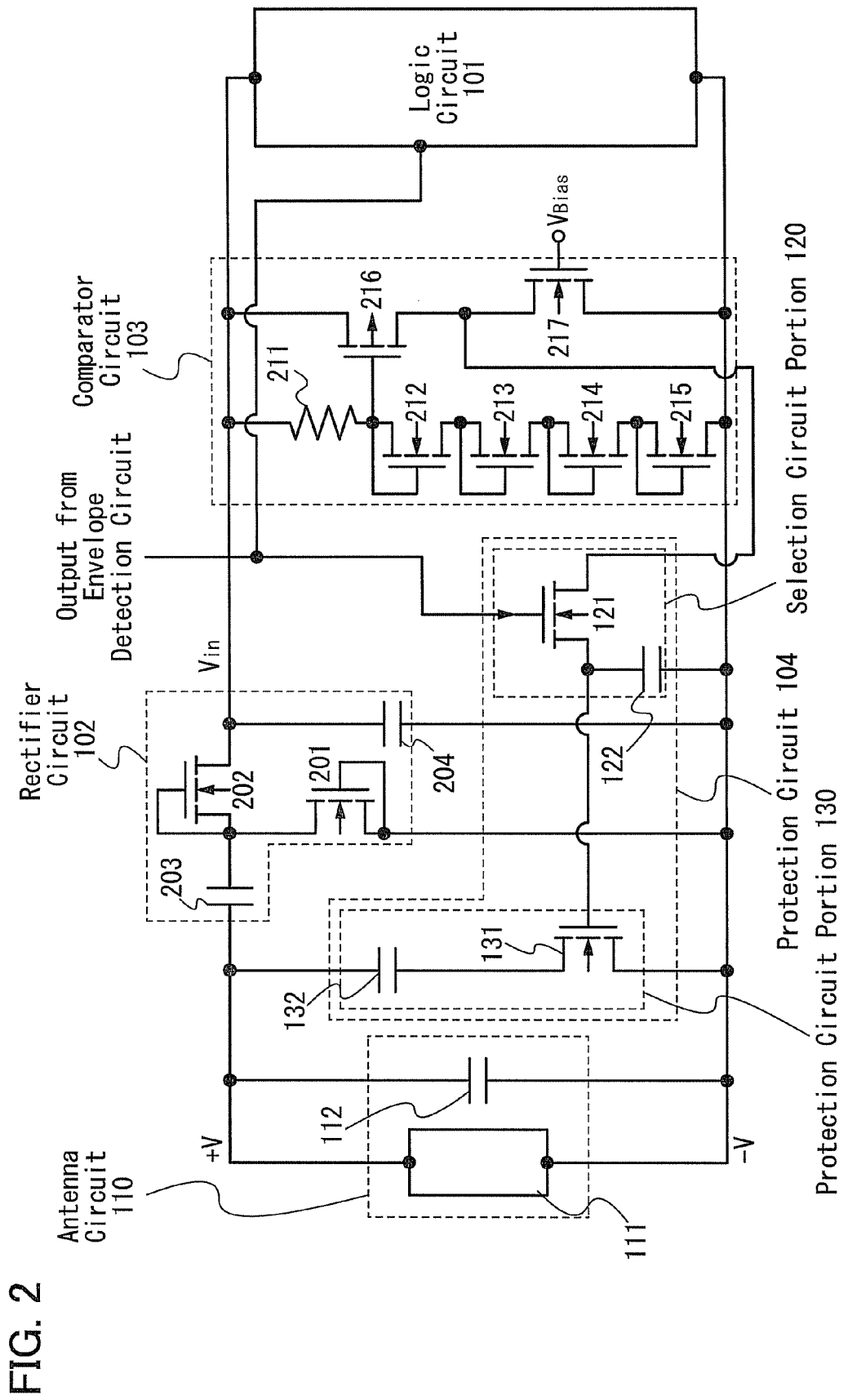
FIG. 2 is a diagram showing a structure example of a protection circuit according to one embodiment of the present invention.

In this embodiment, although a circuit structure is shown as an example, the circuit structure is not limited to the structure shown in FIG. 2. For example, although the capacitor 132 is used as a load for changing impedance, a resistor may be used. In addition, a PIN diode may be used for each of the diode-connected transistors 212 to 215.

Embodiment 3

In this embodiment, a layout example in which transistors, a resistor, and a wiring group, which are included in a rectifier circuit, a comparator circuit, and a protection circuit which are in the RFID tag according to one embodiment of the present invention described in Embodiment 1, are actually formed over a substrate is shown.

Figure 3:
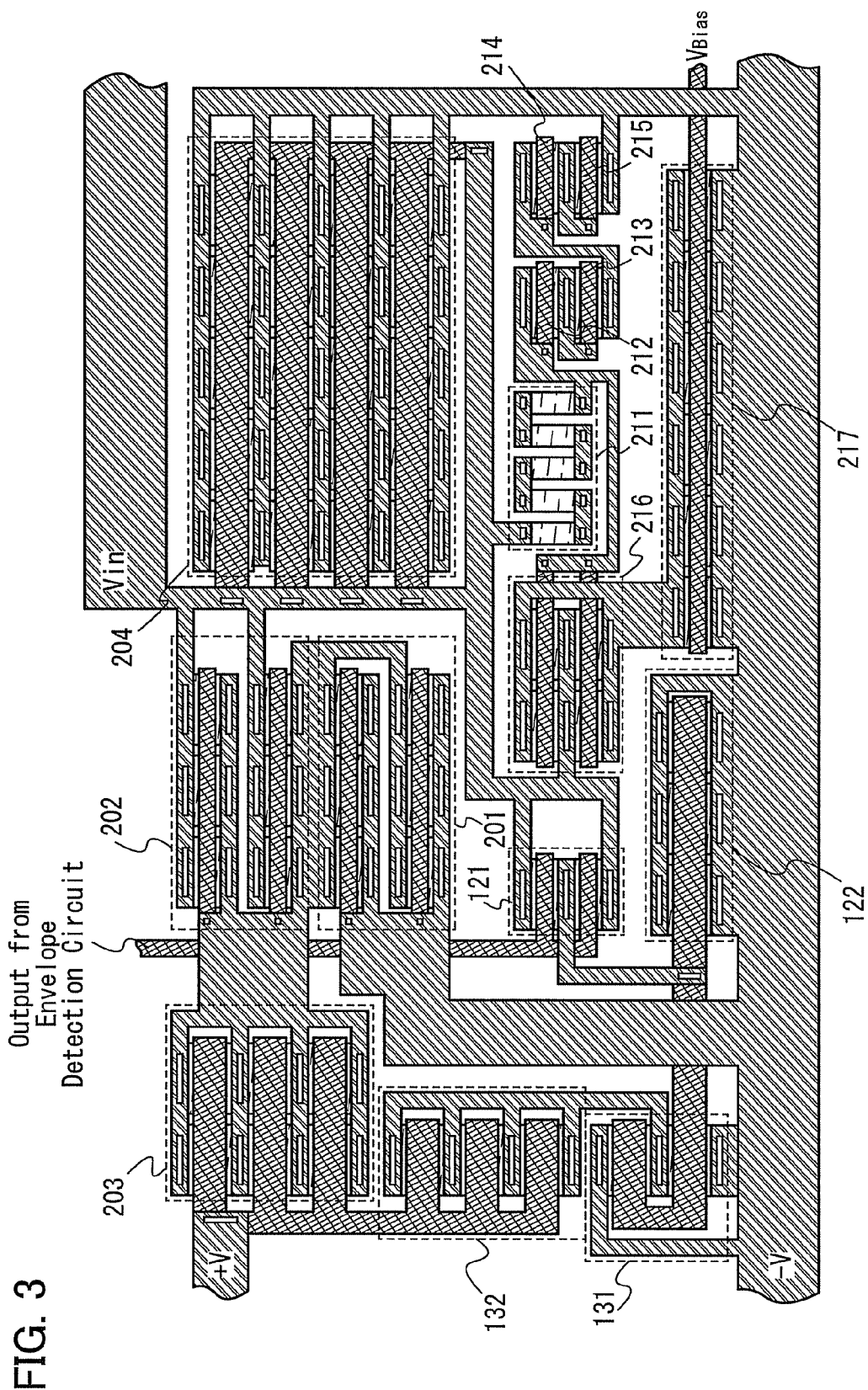
FIG. 3 is a diagram showing an example of circuit layout of a protection circuit according to one embodiment of the present invention.

An example of element layout is shown in FIG. 3. Reference numerals which denote each of the portions in FIG. 3 correspond to the reference numerals used in FIG. 2.

Although not particularly shown in the figure, the resistor 211 may be laid out in such a manner that a plurality of small unit resistors are arranged in parallel or in series in the design and connection between the resistors can be changed and adjusted by using an upper wiring layer so that the resistors have resistance values corresponding to design values.

In addition, as for the transistors denoted by 131, 121, 201 to 202, and 212 to 217 and the like, an adverse effect of variations is preferably suppressed by forming large transistors by connecting a plurality of small transistors connected in parallel.

Each of the capacitors 122, 132, 203, and 204 has the same configuration as the transistor and is formed as a MOS (metal oxide silicon) capacitor with a semiconductor layer, a gate electrode layer, and a wiring layer. When elements can be formed in the same steps as the transistors in such a manner, the elements can be formed without additional steps, which is preferable. Further, the capacitors may be laid out in such a manner that a plurality of small unit capacitors are arranged in parallel and each connection between the capacitors can be changed and adjusted by using an upper wiring layer so that the capacitors have capacitance values corresponding to design values.

Needless to say, as well as a MOS capacitor described above, for example, an MIM (metal insulator metal) capacitor with a gate electrode layer, a wiring layer, and an insulating film therebetween can be applied to a capacitor. A capacitor may be formed by combining as appropriate a conductive layer and an insulating layer which are formed in a step of forming a transistor.

Embodiment 4

In this embodiment, a manufacturing method for obtaining the RFID tag shown in the above embodiment is described.

First, a separation layer 1202 is formed on one surface of a substrate 1201, and then an insulating film 1203 to be a base and a semiconductor film 1204 (for example, a film containing amorphous silicon) are formed (see FIG. 5A). The separation layer 1202, the insulating film 1203, and the semiconductor film 1204 can be consecutively formed. By forming them consecutively, they are not exposed to the air so that impurities can be prevented from being contained therein.

As the substrate 1201, a glass substrate, a quartz substrate, a metal substrate, a stainless steel substrate, a plastic substrate which can withstand the treatment temperature of the process described here, or the like can be used. When such a substrate is used, area and shape thereof are not restricted so much; therefore, by using a rectangular substrate with at least one meter on a side, for example, the productivity can be drastically improved. This is a major advantage as compared to the case of using a circular silicon substrate. Therefore, even in the case of forming a large circuit portion, the lower cost as compared to the case of using a silicon substrate can be realized.

Note that, in the process described here, the separation layer 1202 is provided on an entire surface of the substrate 1201; however, after providing the separation layer on the entire surface of the substrate 1201, the separation layer 1202 may be selectively etched by photolithography, if necessary. In addition, although the separation layer 1202 is formed to be in contact with the substrate 1201, an insulating film such as a silicon oxide film, a silicon oxynitride film, a silicon nitride film, or a silicon nitride oxide film may be formed to be in contact with the substrate 1201, if necessary, and then the separation layer 1202 may be formed to be in contact with the insulating film.

Note that here, an oxynitride is a substance that contains more oxygen than nitrogen, and a nitride oxide is a substance that contains more nitrogen than oxygen. For example, silicon oxynitride is a substance including oxygen, nitrogen, silicon, and hydrogen in ranges of 50 at. % to 70 at. %, 0.5 at. % to 15 at. %, 25 at. % to 35 at. %, and 0.1 at. % to 10 at. %, respectively. Further, silicon nitride oxide is a substance including oxygen, nitrogen, silicon, and hydrogen in ranges of 5 at. % to 30 at. %, 20 at. % to 55 at. %, 25 at. % to 35 at. %, and 10 at. % to 30 at. %, respectively. Note that the above ranges are obtained by measurement using Rutherford backscattering spectrometry (RBS) or hydrogen forward scattering (HFS). Moreover, the total for the content ratio of the constituent elements is taken to be a value that does not exceed 100 at. %.

A stacked-layer structure or the like of a metal film or with a metal film and metal oxide film can be used for the separation layer 1202. The metal film has a single-layer structure or a stacked-layer structure of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir); with an alloy material which contains any of these elements as its main component; or with a compound material which contains any of these elements as its main component. In addition, the film can be formed by a sputtering method, various CVD methods such as a plasma CVD method or the like, using these materials. As the stacked-layer structure of a metal film and metal oxide film, after the above metal film is formed, an oxide or oxynitride of the metal film can be formed on the metal film surface by performing a plasma treatment in an oxygen atmosphere or an $N_2O$ atmosphere; or a thermal treatment in an oxygen atmosphere or an $N_2O$ atmosphere. Alternatively, the surface of the metal film may be processed with a strong oxidative solution such as ozone water after the above metal film is formed, whereby an oxide or an oxynitride of the metal film can be provided on the metal film.

The insulating film 1203 has a single-layer structure or stacked-layer structure of a film containing an oxide of silicon or/and a nitride of silicon by a sputtering method, a plasma CVD method or the like. In the case where the insulating film to be a base has a two-layer structure, a silicon nitride oxide film may be formed for a first layer, and a silicon oxynitride film may be formed for a second layer, for example. In the case where the insulating film to be a base has a three-layer structure, a silicon oxide film, a silicon nitride oxide film, and a silicon oxynitride film may be formed for a first layer, a second layer, and a third layer, respectively. Alternatively, a silicon oxynitride film, a silicon nitride oxide film, and a silicon oxynitride film may be formed for a first layer, a second layer, and a third layer, respectively. The insulating film 1203 to be a base functions as a blocking film for preventing entry of an impurity from the substrate 1201.

The semiconductor film 1204 is formed to a thickness of 25 to 200 nm, preferably of 50 to 70 nm, specifically of 66 nm by a sputtering method, an LPCVD method, a plasma CVD method, or the like. The semiconductor film 1204 may be foamed with an amorphous silicon film, for example.

Next, the semiconductor film 1204 is irradiated with laser light to be crystallized. Note that the semiconductor film 1204 may be crystallized by a method in which laser light irradiation is combined with thermal crystallization using RTA or an annealing furnace or thermal crystallization using a metal element which promotes crystallization. After that, the obtained crystalline semiconductor film is etched into a desired shape, whereby semiconductor films 1204a and 1204b are formed. Then, a gate insulating film 1205 is formed so as to cover the semiconductor films 1204a and 1204b (see FIG. 5B).

An example of a manufacturing process of the semiconductor films 1204a and 1204b is briefly described below. First, the amorphous semiconductor film (e.g., an amorphous silicon film) is formed by a plasma CVD method. Next, a solution containing nickel, which is a metal element for promoting crystallization, is retained on the amorphous semiconductor film, and then dehydrogenation treatment (at 500° C., for one hour) and thermal crystallization treatment (at 550° C. for four hours) are performed on the amorphous semiconductor film, to form a crystalline semiconductor film. After that, the crystalline semiconductor film is irradiated with laser light from a laser oscillator in accordance with a level of crystallization if necessary, and a photolithography method is used, so that the semiconductor films 1204a and 1204b are formed. Note that without conducting the thermal crystallization using the metal element for promoting crystallization, the amorphous semiconductor film may be crystallized only by laser light irradiation.

Further, the semiconductor films 1204a and 1204b obtained by scanning of the semiconductor film in one direction to crystallize the semiconductor film while irradiating the semiconductor film with a continuous wave laser beam or a laser beam oscillated with a repetition rate of 10 MHz or more can be formed. In such a case of crystallization, crystals tend to grow in a scanning direction of the laser beam. Transistors may be disposed so that the scanning direction is aligned with the channel length direction (the direction in which carriers flow when a channel formation region is formed).

Next, the gate insulating film 1205 which covers the semiconductor film 1204a and the semiconductor film 1204b is formed. The gate insulating film 1205 has a single-layer structure or stacked-layer structure of a film containing oxide of silicon or nitride of silicon by a CVD method, a sputtering method, or the like. Specifically, the gate insulating film 1205 has a single-layer structure or stacked-layer structure of a silicon oxide film, a silicon oxynitride film, or/and a silicon nitride oxide film.

Alternatively, the gate insulating film 1205 may be formed by performing plasma treatment on the semiconductor films 1204a and 1204b to oxidize or nitride the surface thereof. For example, the gate insulating film 1205 is formed by a plasma treatment with a mixed gas of a rare gas such as He, Ar, Kr, and Xe, and oxygen, nitrogen dioxide ($NO_2$), ammonia, nitrogen, hydrogen, and the like. When plasma excitation in this case is performed by using microwaves, high-density plasma can be produced at low electron temperature. The surface of the semiconductor film can be oxidized or nitrided with oxygen radicals (which may include OH radicals) or nitrogen radicals (which may include NH radicals) that is produced by the high-density plasma.

By such high-density plasma treatment, an insulating film with a thickness of 1 to 20 nm, typically 5 to 10 nm, is formed on the semiconductor film. Since the reaction in this case is a solid-phase reaction, interface state density between the insulating film and the semiconductor films can be made extremely low. With such high-density plasma treatment, the semiconductor film (crystalline silicon or polycrystalline silicon) is directly oxidized (or nitrided); therefore, unevenness in thickness of the insulating film to be formed can be extremely reduced. In addition, oxidation does not proceed even in the vicinity of a crystal grain boundary of crystalline silicon, which makes a very preferable condition. In other words, by conducting solid phase oxidization to a surface of the semiconductor film with high-density plasma treatment shown here, an insulating film with good uniformity and low interface state density can be formed without excessive oxidation reaction in the vicinity of the crystal grain boundary.

As the gate insulating film 1205, only an insulating film formed by plasma treatment may be used, or an insulating film such as silicon oxide, silicon oxynitride, silicon nitride, may be additionally deposited by a CVD method using plasma or thermal reaction and may be stacked thereon. In either case, a transistor including an insulating film formed by plasma treatment, in a part of the gate insulating film or in the whole gate insulating film is preferable because variations in the characteristics can be reduced.

Further, in the case where the semiconductor films 1204a and 1204b are aimed by scanning the semiconductor film in one direction to crystallize the semiconductor film while irradiating the semiconductor film with a continuous wave laser beam or a laser beam oscillated at a repetition rate of 10 MHz or more, by combining the gate insulating film on which the above plasma treatment is performed, a thin film transistor (TFT) with less variations in characteristics and high electron field-effect mobility can be obtained.

Next, a conductive film is formed over the gate insulating film 1205. Here, a conductive film with a thickness of approximately 100 nm to 500 nm has a single-layer structure. As a material used for the conductive film, a material containing an element selected from: tantalum (Ta), tungsten (W), titanium (Ti), molybdenum (Mo), aluminum (Al), copper (Cu), chromium (Cr), niobium (Nb), and the like; an alloy material which contains any of these elements as its main component; or a compound material which contains any of these elements as its main component can be used. A semiconductor material typified by polycrystalline silicon doped with an impurity element such as phosphorus may be also used. In the case where the conductive film has a stacked-layer structure, for example, a stacked-layer structure of a tantalum nitride film and tungsten film, a stacked-layer structure of a tungsten nitride film and a tungsten film, and a stacked-layer structure of a molybdenum nitride film and molybdenum film can be used. For example, a stacked-layer structure of 30-nm-thick tantalum nitride and 150-nm-thick tungsten can be used. Since tungsten and tantalum nitride have high thermal resistance, a thermal treatment for thermal activation can be performed after the conductive film is formed. Further, the conductive film may have a stacked-layer structure of three or more layers; for example, a stacked-layer structure of a molybdenum film, aluminum film, and molybdenum film can be employed.

Next, a resist mask is formed over the above conductive film by a photolithography method, and then an etching treatment for forming gate electrodes and gate wirings is performed and gate electrodes 1207 are formed above the semiconductor films 1204a and 1204b.

Next, a resist mask is formed by a photolithography method, and an impurity element imparting n-type or p-type conductivity is added to the semiconductor films 1204a and 1204b at low concentration by an ion doping method or an ion implantation method. In this embodiment, an impurity element imparting n-type conductivity is added to the semiconductor films 1204a and 1204b at low concentration. As the impurity element imparting n-type conductivity, a Group 15 element such as phosphorus (P) or arsenic (As) may be used. As the impurity element imparting p-type conductivity, a Group 13 element such as boron (B) may be used.

In this embodiment, for simplicity, only n-channel TFTs are used; however, the present invention is not interpreted as being limited thereto. Only p-channel TFTs may be used as well. Alternatively, an n-channel TFT and a p-channel TFT may be formed in combination. In the case where an n-channel TFT and a p-channel TFT are formed in combination, a mask covering a semiconductor layer which is to be the p-channel TFT is formed and an impurity element imparting n-channel conductivity is added thereto, and then a mask covering the semiconductor layer which is to be the n-channel TFT is formed and an impurity element imparting p-type conductivity is added thereto. Therefore, the impurity element imparting n-type conductivity and the impurity element imparting p-type conductivity can be selectively added.

Next, an insulating film is formed so as to cover the gate insulating film 1205 and the gate electrodes 1207. The insulating film has a single layer or stacked layers of a film containing an inorganic material such as silicon, silicon oxide, or silicon nitride, or a film containing an organic material such as an organic resin, by a plasma CVD method, a sputtering method, or the like. The insulating film is selectively etched by anisotropic etching which is etching mainly in a perpendicular direction, so that insulating films (also referred to as sidewalls) 1208 that are in contact with side surfaces of the gate electrodes 1207 are formed. The insulating films 1208 are used as masks for adding an impurity element in a following step where LDD (lightly doped drain) regions are fog med.

Next, the semiconductor films 1204a and 1204b are doped with the impurity element imparting n-type conductivity using resist masks formed by a photolithography method, and the gate electrodes 1207 and insulating films 1208 as masks. Accordingly, channel formation regions 1206a, first impurity regions 1206b, and second impurity regions 1206c are foamed (see FIG. 5C). The first impurity regions 1206b function as source and drain regions of a thin film transistor, and the second impurity regions 1206c function as LDD regions. The concentration of the impurity element in each second impurity region 1206c is lower than that in each first impurity region 1206b.

Then, an insulating film has a single-layer structure or a stacked-layer structure so as to cover the gate electrodes 1207 and the insulating films 1208. In this embodiment, the case where insulating films 1209, 1210, and 1211 are stacked in three layers is shown as an example. The insulating films can be formed by a CVD method, and the insulating film 1209, the insulating film 1210, and the insulating film 1211 are formed as a 50-nm-thick silicon oxynitride film, a 200-nm-thick silicon nitride oxide film, and a 400-nm-thick silicon oxynitride film respectively. Although it depends on the thickness of the insulating films, surfaces of the insulating films follow the surface shape of a layer provided below the insulating films. That is, since the insulating film 1209 is thin, its surface closely follows the surface shape of the gate electrodes 1207. The more the thickness becomes, the more the surface shape becomes closer to a flat shape; thus, the insulating film 1211 which is the thickest in the three layers has a surface shape which is close to a flat shape. However, unlike the organic material, the surface shape of the insulating film 1211 differs from a flat surface shape. That is, in order to flatten the surface shape, an organic material such as polyimide, polyamide, benzocyclobutene, acrylic, or epoxy; a siloxane material; or the like may be used. In addition, as a formation method of the insulating films, as well as a CVD method, a sputtering method, an SOG method, a droplet-discharge method, a screen printing method, or the like can be employed.

Then, after the insulating films 1209, 1210, 1211, and the like are etched by a photolithography method so that contact holes which reach the first impurity regions 1206b are formed, conductive films 1231a which function as source electrodes or drain electrodes of thin film transistors and conductive film 1231b which functions as a connection wiring are formed. The conductive films 1231a and 1231b can be formed by forming a conductive film so as to fill the contact holes and selectively etching the conductive film. Note that before the conductive film is formed, a silicide may be formed on surfaces of the semiconductor films 1204a and 1204b which are exposed in the contact holes, whereby resistance is reduced. It is preferable that the conductive films 1231a and 1231b be formed using a low resistance material because they do not cause signal delay. Since low resistance material has low heat resistance in many cases, materials having high heat resistance may be provided over and below the low resistance material. For example, it is preferable to form 300-nm-thick aluminum as the low resistance material and provide 100-nm-thick titanium over and below the aluminum. Note that although the conductive film 1231b functions as a connection wiring, when the conductive film 1231b has the same stacked-layer structure as the conductive films 1231a, reduction in resistance of the connection wiring and improvement in heat resistance can be realized. The conductive films 1231a and 1231b have a single-layer structure or a stacked-layer structure of a different conductive material, for example, a material containing an element selected from tungsten (W), tantalum (Ta), molybdenum (Mo), nickel (Ni), platinum (Pt), copper (Cu), gold (Au), silver (Ag), manganese (Mn), neodymium (Nd), carbon (C), or silicon (Si); an alloy material which contains any of these elements as its main component; or a compound material which contains any of these elements as its main component. An alloy material which contains aluminum as its main component corresponds to, for example, a material which contains aluminum as its main component and which also contains nickel, or an alloy material which contains aluminum as its main component and which also contains nickel and one of or both carbon and silicon. In addition, the conductive films 1231a and 1231b can be formed by a CVD method, a sputtering method, or the like.

In this manner, an element layer 1249 which contains a thin film transistor 1230a and a thin film transistor 1230b can be obtained (see FIG. 6A).

Note that before forming the insulating films 1209, 1210, and 1211, after forming the insulating film 1209 or after forming the insulating films 1209 and 1210, thermal treatment is preferably performed to recover crystallinity of the semiconductor film 1204; to activate an impurity element which is added to the semiconductor film 1204; or to hydrogenate the semiconductor film 1204. For the thermal treatment, a thermal annealing method, a laser annealing method, an RTA method, or the like is preferably employed.

Next, insulating films 1212 and 1213 are formed so as to cover the conductive films 1231a and 1231b (see FIG. 6B). The case where a 100-nm-thick silicon nitride film is used as the insulating film 1212 and 1500-nm-thick polyimide is used as the insulating film 1213 is described as an example. It is preferable that the insulating film 1213 has a surface shape with great flatness. Therefore, besides the feature of polyimide as an organic material, even with a thick-film structure, for example, a structure with a film thickness of 750 nm to 3000 nm (specifically a thickness of 1500 nm), the insulating film 1213 has great flatness. An opening portion is formed in the insulating films 1212 and 1213. In this embodiment, the case where an opening portion 1214 through which the conductive film 1231b is exposed is formed is described as an example. In the opening portion 1214 (specifically in a region 1215 surrounded by a dotted line), an end portion of the insulating film 1212 is covered with the insulating film 1213. By covering the end portion of the insulating film 1212 which is a lower layer with the insulating film 1213 which is an upper layer, disconnection in a wiring which is to be formed in the opening portion 1214 can be prevented. In this embodiment, since the insulating film 1213 is formed using polyimide, which is an organic material, the insulating film 1213 can have a slight tapered shape in the opening portion 1214; therefore, disconnection can be effectively prevented. As a material for the insulating film 1213 which can prevent disconnection in such a manner, as well as polyimide, an organic material such as polyamide, benzocyclobutene, acrylic, or epoxy, a siloxane material; or the like can be used. In addition, as the insulating film 1212, a silicon oxynitride film or a silicon nitride oxide film can be used instead of a silicon nitride film. Further, as a formation method of the insulating films 1212 and 1213, a CVD method, a sputtering method, an SOG method, a droplet-discharge method, a screen printing method, or the like can be employed.

Next, a conductive film 1217 is formed over the insulating film 1213 and then, an insulating film 1218 is formed over the conductive film 1217 (see FIG. 6C). The conductive film 1217 can be formed using the same material as the conductive films 1231a and 1231b and for example, can have a stacked-layer structure of 100-nm-thick titanium, 200-nm-thick aluminum, and 100-nm-thick titanium. Since the conductive film 1217 is connected to the conductive film 1213b in the opening portion 1214, contact resistance can be reduced because titanium is in contact with each other. In addition, a current based on a signal between a thin film transistor and an antenna which is formed in a following step flows through the conductive film 1217; thus, it is preferable that wiring resistance be low. Therefore, a low resistance material such as aluminum is preferably used. The conductive film 1217 has a single-layer structure or a stacked-layer structure of a different conductive material, for example, a material containing an element selected from tungsten (W), tantalum (Ta), molybdenum (Mo), nickel (Ni), platinum (Pt), copper (Cu), gold (Au), silver (Ag), manganese (Mn), neodymium (Nd), carbon (C), or silicon (Si); an alloy material which contains any of these elements as its main component; or a compound material which contains any of these elements as its main component. An alloy material which contains aluminum as its main component corresponds to, for example, a material which contains aluminum as its main component and which also contains nickel, or an alloy material which contains aluminum as its main component and which also contains nickel and one of or both carbon and silicon. In addition, the conductive film 1217 can be formed by a CVD method, a sputtering method, or the like. Since the insulating film 1218 needs to have flatness, it is preferably formed using an organic material, and the case where 200-nm-thick polyimide is used is described as an example. The insulating film 1218 needs to flatten unevenness of a surface of the opening portion 1214 formed in the 1500-nm-thick insulating film 1213; and unevenness of a surface of the conductive film 1217 formed in the opening portion 1214; thus, insulating film 1218 is formed to a thickness of 2000 nm which is larger than the thickness of the insulating film 1213. Therefore, the thickness of the insulating film 1218 may be 1.1 times to twice, preferably 1.2 to 1.5 times the thickness of the insulating film 1213. When the insulating film 1213 has a thickness of 750 to 3,000 nm, it is preferable that the thickness of the insulating film 1218 is 900 to 4,500 nm. For the insulating film 1218, considering the thickness thereof, a material with greater flatness may be used. As a material with great flatness used for the insulating film 1218, as well as polyimide, an organic material such as polyamide, benzocyclobutene, acrylic, or epoxy; a siloxane material; or the like can be employed. In the case where an antenna is formed over the insulating film 1218, a flatness of a surface shape of the insulating film 1218 needs to be considered in such a manner.

In addition, the insulating film 1218 preferably covers an end portion of the insulating film 1213 outside (not shown) the antenna in a circuit portion. When covering the insulating film 1213 with the insulating film 1218, the end portion of the insulating film 1218 is preferably located to have a margin from the outside, which is two or more times as long as the total thickness of the insulating film 1213 and the insulating film 1218. In this embodiment, the insulating film 1213 is formed to a thickness of 1500 nm and the insulating film 1218 is formed to a thickness of 2000 nm; thus, the insulating film 1218 covering the end portion of the insulating film 1213 is located to have a distance (d=7000 nm) from the end of the insulating film 1213. With such a structure, a margin for a process is secured and moisture or oxygen can be prevented from being mixed.

Figure 7:
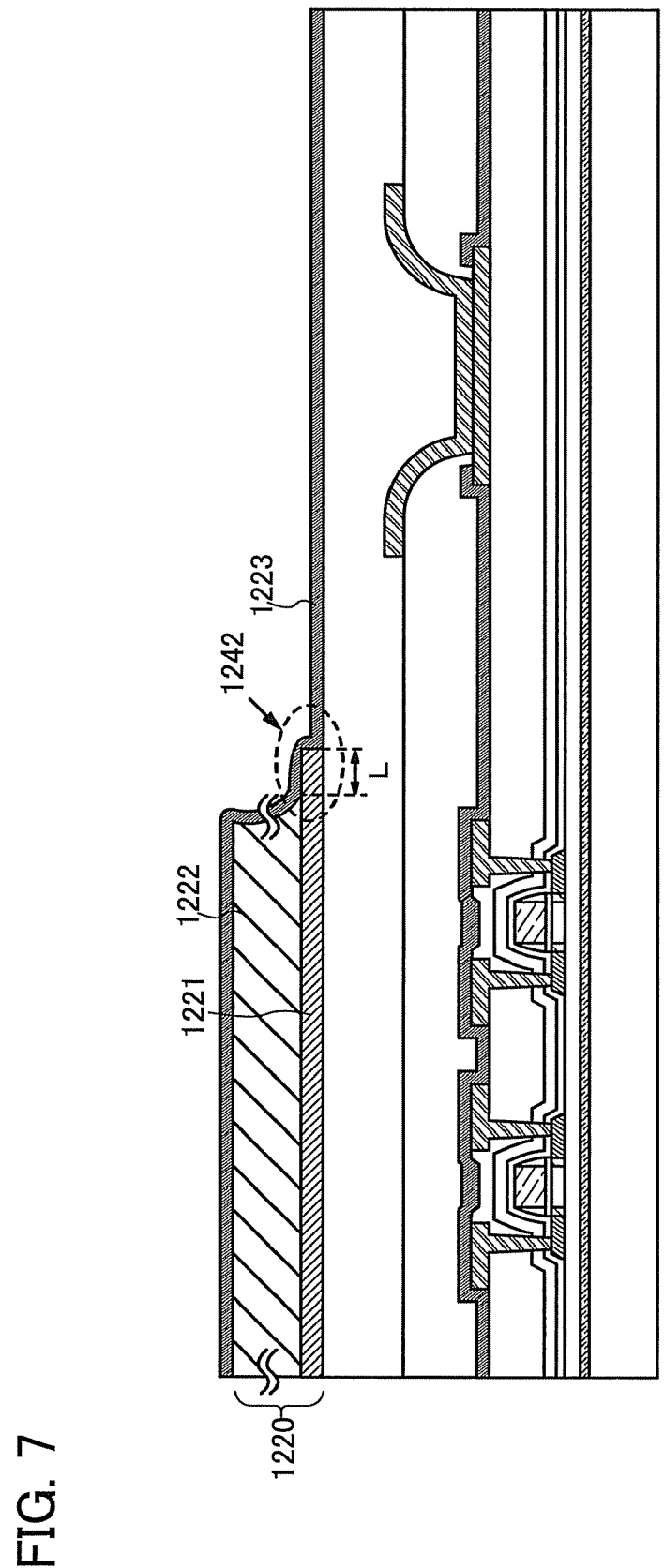
FIG. 7 is a diagram showing an example of the manufacturing process of an RFID tag.
Figure 8A:
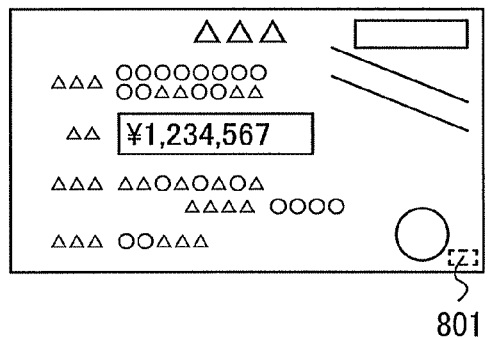
FIGS. 8A to 8G are diagrams showing application examples of an RFID tag including a protection circuit according to one embodiment of the present invention.
Figure 8B:
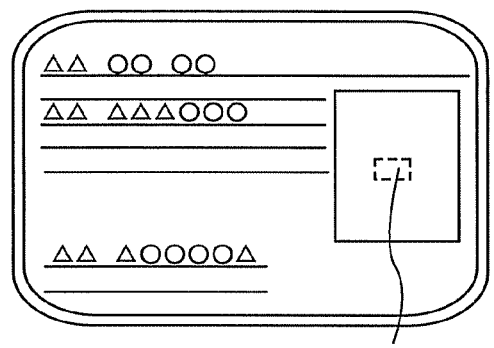
Figure 8C:
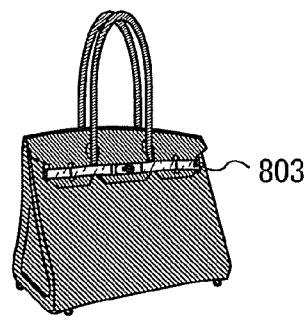
Figure 8D:
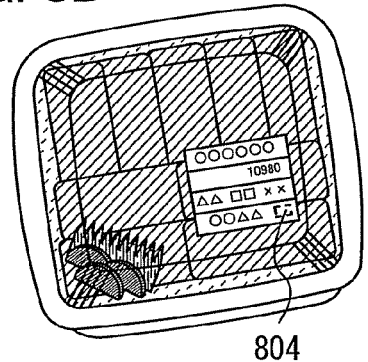
Figure 8E:
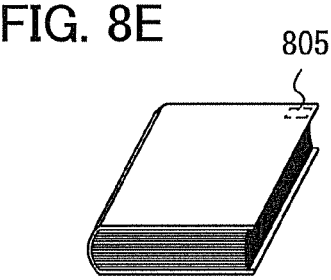
Figure 8F:
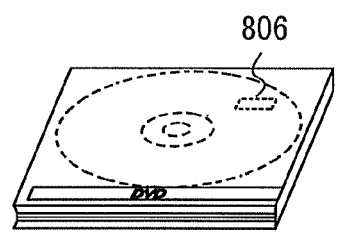
Figure 8G:
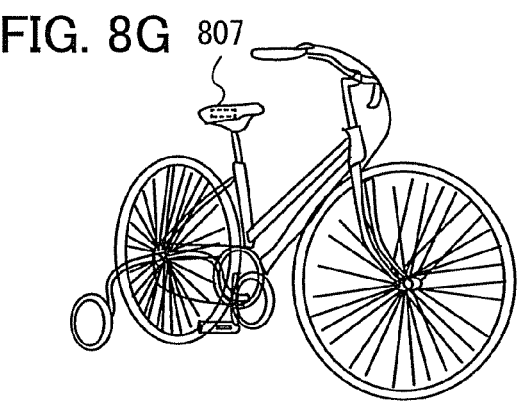

Next, an antenna 1220 is formed over the insulating film 1218 (see FIG. 7). Then, the antenna 1220 and the conductive film 1217 are electrically connected to each other through the opening portion. The opening portion is provided below the antenna 1220 to achieve high integration. Note that the antenna 1220 may be directly connected to the conductive films 1231a; however, it is preferable that the conductive film 1217 is provided as in this embodiment because margin can be secured in formation of the opening portion for connection to the antenna 1220 and high integration can be achieved. Therefore, the antenna 1220 may be connected to the conductive films 1231a with provision of an additional conductive film over the conductive film 1217. That is, the antenna 1220 should be electrically connected to the conductive films 1231a which are included in a thin film transistor, and high integration can be achieved by a connection structure constructed through a plurality of conductive films. Such a plurality of conductive films including the conductive film 1217 are preferably made thin because as the plurality of conductive films become thick, an RFD tag also becomes thick as well. Therefore, as compared to the conductive films 1231a, the conductive film 1217 and the like are preferably made thin.

As the antenna 1220, a stacked-layer structure of a first conductive film 1221 and second conductive film 1222 can be employed. In this embodiment, the case of a stacked-layer structure of 100-nm-thick titanium and 5000-nm-thick aluminum is described as an example. Titanium can improve moisture resistance of the antenna and adhesiveness between the insulating film 1218 and the antenna 1220. Further, titanium can decrease connection resistance between the antenna 1220 and the conductive film 1217. That is because titanium is formed in the top layer of the conductive film 1217, whereby the same materials, titanium in the antenna and titanium in the conductive film 1217, are in contact with each other. Since such titanium is formed by dry etching, its edge portion is steep in many cases. Aluminum is suitable for the antenna because it is a low resistance material. By making the aluminum film thick, resistance can be further lowered. When the resistance of the antenna is lowered, a communication distance can be extended, which is preferable. Since such aluminum is formed by wet etching, a side surface of an edge portion is tapered in many cases. A taper in this embodiment has a shape with a projection on the aluminum, that is, a shape with a depression on the inside. In addition, when aluminum is wet-etched, the edge portion of aluminum is set to be on an inner side than the edge portion of titanium (a region 1242). For example, the edge portion of aluminum may be provided on the inner side than the edge portion of titanium by a distance (a distance L) of ⅙ to ½ of the thickness of aluminum. In this embodiment, the edge portion of aluminum may be provided on the inner side of the edge portion of titanium by a distance L of 0.8 to 2 μm. Since the edge portion of titanium projects more greatly than the edge portion of aluminum, disconnection in an insulating film to be formed in a following step can be prevented, and resistance of the antenna can be improved.

As for the antenna, as its conductive material, a material containing a metal element such as silver (Ag), copper (Cu), gold (Au), platinum (Pt), nickel (Ni), palladium (Pd), tantalum (Ta), or molybdenum (Mo), as well as titanium and aluminum; an alloy material which contains any of these metal elements; or a compound material which contains any of these metal elements can be employed. The antenna can be formed by a CVD method, a sputtering method, a printing method such as a screen printing method or a gravure printing method, a droplet-discharge method, a dispenser method, a plating method, or the like. In addition, although in this embodiment, a stacked-layer structure is described as an example, the antenna may have a single-layer structure of any of the above materials.

An insulating film 1223 is formed so as to cover the antenna 1220. In this embodiment, the insulating film 1223 is formed using a 200-nm-thick silicon nitride film. By the insulating film 1223, moisture resistance of the antenna can be further improved, which is preferable. Since the edge portion of titanium projects more greatly than the edge portion of aluminum, the insulating film 1223 can be formed without being disconnected. The insulating film 1223 can be formed using: a silicon oxynitride film, a silicon nitride oxide film, and another inorganic material, as well as a silicon nitride film.

In such a manner, an RFID tag formed using an insulating substrate can be completed.

This embodiment can be implemented in combination with any of the other embodiments as appropriate.

Embodiment 5

In this embodiment, a method for forming an RFID tag with high reliability and high yield is described with reference to FIGS. 9A to 9D. In this embodiment, a CMOS (complementary metal oxide semiconductor) is described as an example.

Figure 9A:
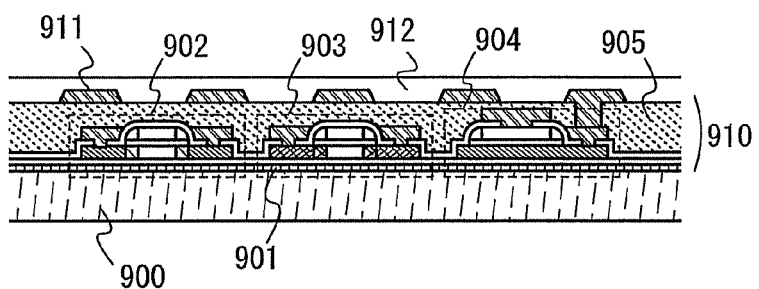
FIGS. 9A to 9D are diagrams showing an example of a manufacturing process of an RFID tag.
Figure 9B:
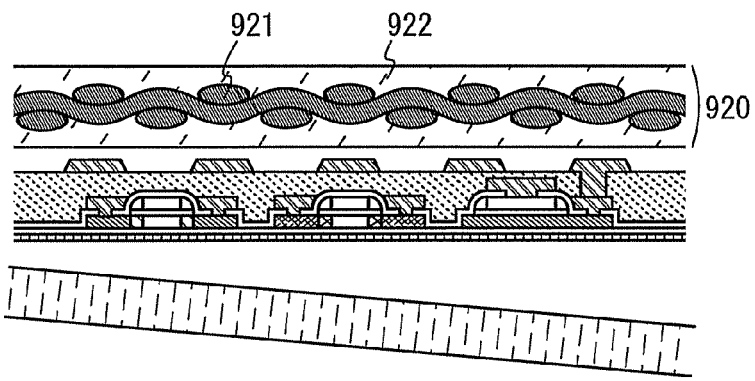

Transistors 902 and 903, a capacitor 904, and an insulating layer 905 are provided over a substrate 900 with a separation layer 901 interposed therebetween, and a semiconductor integrated circuit 910 is formed (see FIG. 9A).

The transistors 902 and 903 are thin film transistors each including a source and drain regions, a low-concentration impurity region, a channel formation region, a gate insulating layer, a gate electrode, and a source and drain electrodes. The source and drain regions are in contact with and electrically connected to wirings serving as the source and drain electrodes.

The transistor 902 is an n-channel transistor, and the source and drain regions and the low-concentration impurity region thereof contain an impurity element imparting n-type conductivity (e.g., phosphorus (P), arsenic (As)). The transistor 903 is a p-channel transistor, and the source and drain regions and the low-concentration impurity region thereof contain an impurity element imparting p-type conductivity (e.g., boron (B), aluminum (Al), or gallium (Ga)).

The capacitor 904 is formed in the same steps as the transistors 902 and 903. One electrode of the capacitor 904 is formed using a semiconductor layer and the other electrode of the capacitor 904 is formed using a gate electrode layer. In this case, in order to efficiently secure a capacitance value, before forming a gate electrode layer, an impurity element may be added to a semiconductor layer included in the capacitor 904. With such a process, impurity element is also added to a semiconductor layer provided below the gate electrode layer; therefore, the capacitor 904 can efficiently function as a capacitor.

Next, antennas 911 including conductive films are formed over the insulating layer 905, and a protective film 912 is formed over the antennas 911. The antennas 911 are electrically connected to the semiconductor integrated circuit. In FIG. 9A, one of the antennas 911 is electrically connected to the one electrode of the capacitor 904.

Then, an insulator 920 is formed over the protective film 912. For example, a structure body in which fibrous bodies 921 are impregnated with an organic resin 922 can be used as the insulator 920.

After bonding the insulator 920 to the protection film 912, the semiconductor integrated circuit 910, the antennas 911, and the protective film 912 are separated from the substrate 900 along the separation layer 901 which serves as an interface. Accordingly, the semiconductor integrated circuit 910, the antennas 911, and the protective film 912 are provided on the insulator 920 side (see FIG. 9B).

For the bonding between the insulator 920 and the protective film 912, although not particularly shown in the figure, adhesive may be used, or pressure bonding or thermo-compression bonding may be used.

Figure 9C:
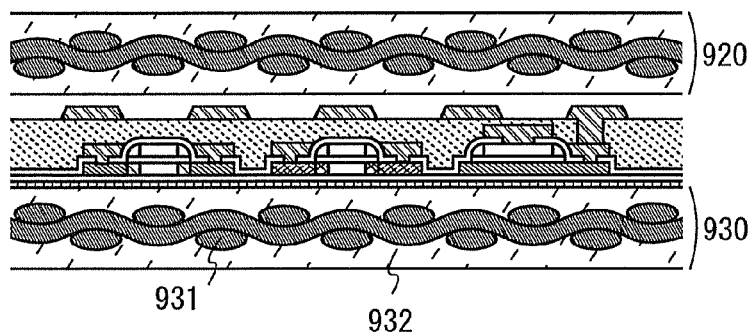
Figure 9D:
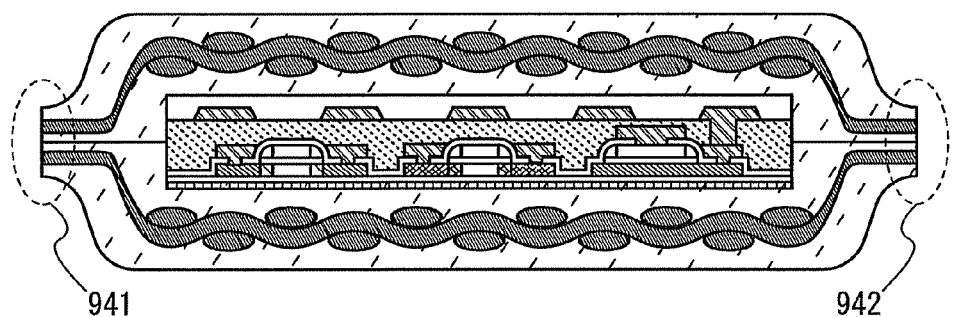

Then, an insulator 930 is bonded to the semiconductor integrated circuit 910 on the separation side exposed through the separation layer 901, and the semiconductor integrated circuit 910, the antennas 911, and the protective film 912 are held between the insulator 920 and the insulator 930 (see FIG. 9C).

As well as the insulator 920, a structure body in which fibrous bodies 931 are impregnated with an organic resin 932 may be used as the insulator 930.

Although not particularly shown, a large number of structure bodies in which a plurality of semiconductor integrated circuits 910, antennas 911, and protective films 912 are formed being arranged in a plane direction are interposed between the insulators 920 and 930; and by dividing them into individual pieces, semiconductor integrated circuit chips in each of which the semiconductor integrated circuit 910, the antennas 911, and the protective film 912 are interposed between the insulators 920 and 930 are manufactured. There is no particular limitation on a dividing means as long as the structure bodies interposed between the insulators 920 and 930 are physically divided into individual pieces, and these are divided along a dividing line by laser light irradiation in this embodiment as a preferable example.

With the laser light irradiation for dividing the structure bodies interposed between the insulators 920 and 930, the insulator 920 and the insulator 930 are melted on divided surfaces 941 and 942 of the semiconductor integrated circuit chip, and are welded to each other. Thus, each of the semiconductor integrated circuit chips has a structure in which the semiconductor integrated circuit 910, the antennas 911, and the protective film 912 are sealed entirely by the insulator 920 and the insulator 930 (see FIG. 9D).

Although not particularly shown here, another insulator may be further provided outside or inside the insulator 920 and the insulator 930 so that the semiconductor integrated circuit 910, the antennas 911, and the protective film 912 are covered entirely more favorably.

Through the above process in which insulators are provided with a semiconductor integrated circuit interposed therebetween, adverse influences such as damage of the semiconductor integrated circuit or defects in characteristics by an external stress or internal stress can be prevented. Thus, an RFID tag can be manufactured with high reliability and high yield.

Note that the RFID tag manufactured in this embodiment can have flexibility with the use of a flexible insulator.

As a material for the semiconductor layer included in the transistors 902 and 903 and the capacitor 904, an amorphous semiconductor (hereinafter also referred to as "AS") that can be formed by a vapor deposition method or a sputtering method using a semiconductor material gas typified by silane or germane, a polycrystalline semiconductor that is formed by crystallizing the amorphous semiconductor by utilizing light energy or thermal energy, a microcrystalline (semiamorphous or microcrystal, hereinafter also referred to as "SAS") semiconductor, or the like can be used. The semiconductor layer can be formed by a sputtering method, an LPCVD method, a plasma CVD method, or the like.

Note that the microcrystalline semiconductor film belongs to a metastable state which is intermediate between an amorphous state and a single crystal state according to Gibbs free energy. That is, the microcrystalline semiconductor is a semiconductor having a third state which is stable in terms of free energy and has a short range order and lattice distortion. In the microcrystalline semiconductor, columnar-like or needle-like crystals grow in a normal direction with respect to a surface of a substrate. The Raman spectrum of microcrystalline silicon, which is a typical example of a microcrystalline semiconductor, is shifted to a small wavenumber region below 520 cm$^{-1}$ which represents single-crystalline silicon. That is, the peak of the Raman spectrum of the microcrystalline silicon exists between 520 cm$^{-1}$ which represents single-crystalline silicon and 480 cm$^{-1}$ which represents amorphous silicon. The microcrystalline semiconductor includes at least 1 at. % or more of hydrogen or halogen to terminate a dangling bond. Moreover, a rare gas element such as helium, argon, krypton, or neon may be included to further promote lattice distortion, so that stability is enhanced and a preferable microcrystalline semiconductor film can be obtained.

The microcrystalline semiconductor film can be formed by a high-frequency plasma CVD method with a frequency of several tens to several hundreds of MHz or a microwave plasma CVD method with a frequency of 1 GHz or more. Typically, the microcrystalline semiconductor film can be formed by using a gas obtained by diluting a silicon hydride such as $SiH_4$, $Si_2H_6$, $SiH_2Cl_2$, $SiHCl_3$, $SiCl_4$, $SiF_4$, or the like, with hydrogen. Additionally, the microcrystalline semiconductor film can be formed by using a gas containing a silicon hydride and hydrogen which is diluted with one or more of rare gas elements selected from helium, argon, krypton, and neon. In this case, the flow rate of hydrogen is set to be greater than or equal to 5 times and less than or equal to 200 times, preferably greater than or equal to 50 times and less than or equal to 150 times, much more preferably 100 times as much as that of silicon hydride.

Hydrogenated amorphous silicon can be typically exemplified as the amorphous semiconductor, and polysilicon (polycrystalline silicon) or the like can be typically exemplified as a crystalline semiconductor. Examples of polysilicon include so-called high-temperature polysilicon that contains polysilicon as a main component and is formed at a process temperature greater than or equal to 800° C., so-called low-temperature polysilicon that contains polysilicon as a main component and is formed at a process temperature less than or equal to 600° C., polysilicon obtained by crystallizing amorphous silicon by using an element that promotes crystallization, or the like, and the like. It is needless to say that as described above, a microcrystalline semiconductor or a semiconductor containing a crystal phase in part of a semiconductor layer may be used.

As a material for the semiconductor, as well as an element of silicon (Si), germanium (Ge), or the like, a compound semiconductor such as GaAs, InP, SiC, ZnSe, GaN, SiGe can be used. Alternatively, an oxide semiconductor such as zinc oxide (ZnO), tin oxide ($SnO_2$), magnesium zinc oxide, gallium oxide, indium oxide, an oxide semiconductor formed of a plurality of the above oxide semiconductors, and the like may be used. For example, an oxide semiconductor formed of zinc oxide, indium oxide, and gallium oxide may be used. In the case of using zinc oxide for the semiconductor layer, a gate insulating layer is preferably formed using $Y_2O_3$, $Al_2O_3$, $TiO_2$, a stacked layer of any of the above substances, or the like. For a gate electrode layer, a source electrode layer, and a drain electrode layer, indium tin oxide (ITO), Au, Ti, or the like is preferably used. In addition, In, Ga, or the like can be added to ZnO.

In the case of using a crystalline semiconductor layer for the semiconductor layer, the crystalline semiconductor layer may be formed by any of various methods (such as a laser crystallization method, a thermal crystallization method, a thermal crystallization method using an element promoting crystallization such as nickel). Further, a microcrystalline semiconductor, which is an SAS, can be crystallized by being irradiated with laser light to increase its crystallinity. In the case where an element which promotes crystallization is not used, before the amorphous silicon film is irradiated with laser light, the amorphous silicon film is heated at 500° C. to 550° C. for one to two hours in a nitrogen atmosphere to reduce a hydrogen concentration in the amorphous silicon film to less than or equal to $1\times10^{20}$ atoms/cm$^3$. This is because, if the amorphous silicon film contains much hydrogen, the amorphous silicon film may be destroyed by laser light irradiation.

Any method can be used for introducing a metal element into the amorphous semiconductor layer as long as the method allows the metal element to exist on the surface of or inside the amorphous semiconductor layer. For example, a sputtering method, a CVD method, a plasma process method (including a plasma CVD method), an adsorption method, or a method of applying a solution of a metal salt can be used. Among the above-mentioned methods, the method using a solution is convenient and has an advantage of easily adjusting the concentration of a metal element. It is preferable to form an oxide film by UV light irradiation in an oxygen atmosphere, a thermal oxidation method, treatment with ozone water or hydrogen peroxide including a hydroxyl radical, or the like in order to improve wettability of the surface of the amorphous semiconductor layer and to spread the aqueous solution over the entire surface of the amorphous semiconductor layer.

The crystallization may be performed by adding an element which promotes crystallization (also referred to as a catalyst element or a metal element) to an amorphous semiconductor layer and performing a thermal treatment (at 550° C. to 750° C. for 3 minutes to 24 hours) in a crystallization step in which the amorphous semiconductor layer is crystallized to form a crystalline semiconductor layer. As the element which promotes (accelerates) the crystallization, one or more of elements selected from iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

In order to remove or reduce the element that promotes crystallization from the crystalline semiconductor layer, a semiconductor layer containing an impurity element is formed in contact with the crystalline semiconductor layer and is made to function as a gettering sink. The impurity element may be an impurity element imparting n-type conductivity, an impurity element imparting p-type conductivity, a rare gas element, or the like. For example, one or more of elements selected from phosphorus (P), nitrogen (N), arsenic (As), antimony (Sb), bismuth (Bi), boron (B), helium (He), neon (Ne), argon (Ar), krypton (Kr), and xenon (Xe) can be used. The semiconductor layer containing a rare-gas element is formed in the crystalline semiconductor layer containing the element that promotes crystallization, and thermal treatment (at 550° C. to 750° C. for 3 minutes to 24 hours) is performed. The element that promotes crystallization in the crystalline semiconductor layer is transported to the semiconductor layer containing the rare-gas element; thus, the element that promotes crystallization in the crystalline semiconductor layer is removed or reduced. After that, the semiconductor layer containing the rare-gas element serving as the gettering sink is removed.

In addition, thermal treatment and laser light irradiation may be combined to crystallize the amorphous semiconductor layer. The thermal treatment and/or the laser light irradiation may be independently performed more than once.

In addition, a crystalline semiconductor layer may be directly formed over a substrate by a plasma treatment method. Alternatively, the crystalline semiconductor layer may be selectively formed over a substrate with a plasma treatment method.

The gate insulating layer may be formed of silicon oxide film or of a stacked-layer structure of silicon oxide film and silicon nitride film. The gate insulating layer may be formed by a plasma CVD method or a low pressure CVD method, or may be formed by depositing an insulating layer by solid phase oxidation or solid phase nitridation by plasma treatment. This is because a gate insulating layer formed by oxidation or nitridation of a single crystal semiconductor layer by plasma treatment is dense, has a high withstand voltage, and is excellent in reliability. For example, a surface of the semiconductor layer is oxidized or nitrided using nitrous oxide ($N_2O$) diluted with Ar by 1 to 3 times (flow ratio) by application of a microwave (2.45 GHz) power of 3 to 5 kW at a pressure of 10 to 30 Pa. By this process, an insulating film having a thickness of 1 nm to 10 nm (preferably 2 nm to 6 nm) is formed. Further, nitrous oxide ($N_2O$) and silane ($SiH_4$) are introduced, and a silicon oxynitride film is formed by a vapor deposition method by application of a microwave (2.45 GHz) power of 3 to 5 kW at a pressure of 10 to 30 Pa; thus, the gate insulating layer is formed. The combination of the solid phase reaction and reaction by the vapor deposition method can form a gate insulating layer with low interface state density and with excellent withstand voltage.

As the gate insulating layer, a high permittivity material such as zirconium dioxide, hafnium oxide, titanium dioxide, or tantalum pentoxide may be also used. When a high permittivity material is used for the gate insulating layer, a gate leak current can be reduced.

The gate electrode layer can be formed by a CVD method, a sputtering method, a droplet-discharge method, or the like. The gate electrode layer may be formed with an element selected from: Ag, Au, Cu, Ni, Pt, Pd, Ir, Rh, W, Al, Ta, Mo, Cd, Zn, Fe, Ti, Si, Ge, Zr, and Ba; an alloy material which contains any of the elements as its main component; or a compound material which contains any of the elements as its main component. Alternatively, a semiconductor film typified by a polycrystalline silicon film doped with an impurity element such as phosphorus, or an AgPdCu alloy may be used. Further, either a single-layer structure or a stacked-layer structure may be employed; for example, a two-layer structure of a tungsten nitride film and a molybdenum film may be employed or a three-layer structure in which a 50-nm-thick tungsten film, a 500-nm-thick film of aluminum-silicon alloy (Al—Si), and a 30-nm-thick titanium nitride film are stacked in this order may be employed. In the case of the three-layer structure, a tungsten nitride film may be used instead of the tungsten film as the first conductive film, an aluminum-titanium alloy (Al—Ti) film may be used instead of the aluminum-silicon alloy (Al—Si) film as the second conductive film, and a titanium film may be used instead of the titanium nitride film as the third conductive film.

A light-transmitting material having a property of transmitting visible light can be also used for the gate electrode layer. Light-transmitting conductive materials include indium tin oxide (ITO), indium tin oxide containing silicon oxide (ITSO), organic indium, organic tin, zinc oxide, and the like. Alternatively, indium zinc oxide (IZO) containing zinc oxide (ZnO), zinc oxide (ZnO), ZnO doped with gallium (Ga), tin oxide ($SnO_2$), indium oxide containing tungsten oxide, indium zinc oxide containing tungsten oxide, indium oxide containing titanium oxide, indium tin oxide containing titanium oxide, or the like may be used.

In the case where etching processing is needed for forming the gate electrode layer, a mask may be formed to perform dry etching or wet etching. The gate electrode layer can be etched into a tapered shape by ICP (inductively coupled plasma) etching and by appropriate adjustment of etching conditions (e.g., the amount of electric power applied to a coiled electrode, the amount of electric power applied to an electrode on the substrate side, and the electrode temperature on the substrate side). Note that a chlorine-based gas typified by $Cl_2$, $BCl_3$, $SiCl_4$, $CCl_4$, or the like; a fluorine-based gas typified by $CF_4$, $SF_6$, $NF_3$, or the like; or $O_2$ can be used as appropriate as an etching gas.

Although a single gate structure is described in this embodiment, a multi-gate structure such as a double gate structure may be also employed as the transistor. In that case, gate electrode layers may be provided above and below the semiconductor layer or a plurality of gate electrode layers may be provided only on one side of (above or below) the semiconductor layer.

Alternatively, a silicide may be formed on the source and drain regions of the transistor. The silicide is formed in such a manner that a conductive film is formed over the source and drain regions of the semiconductor layer, and silicon of the exposed source and drain regions of the semiconductor layer is made to react with the conductive film by thermal treatment, a GRTA method, an LRTA method, or the like. Alternatively, the silicide may be formed by light irradiation using a laser or lamp. As a material of the conductive film which forms the silicide, titanium (Ti), nickel (Ni), tungsten (W), molybdenum (Mo), cobalt (Co), zirconium (Zr), hafnium (Hf), tantalum (Ta), vanadium (V), neodymium (Nd), chromium (Cr), platinum (Pt), palladium (Pd), or the like can be employed.

Wiring layers that serve as source and drain electrode layers can be formed in such a manner that a conductive film is formed by a PVD method, a CVD method, an evaporation method, or the like, and then the conductive film is etched into a desired shape. Alternatively, the wiring layers can be selectively formed at a predetermined place by a printing method, an electroplating method, or the like. Further, a reflow method and a damascene method may be also used. As a material for the wiring layer, a metal such as Ag, Au, Cu, Ni, Pt, Pd, Ir, Rh, W, Al, Ta, Mo, Cd, Zn, Fe, Ti, Zr, and Ba; a semiconductor such as Si or Ge, or an alloy or a nitride thereof can be employed. Alternatively, a light-transmitting material can be employed.

In addition, as a light-transmitting conductive material, indium tin oxide (ITO), indium tin oxide containing silicon oxide (ITSO), indium zinc oxide (IZO) containing zinc oxide (ZnO), zinc oxide (ZnO), ZnO doped with gallium (Ga), tin oxide ($SnO_2$), indium oxide containing tungsten oxide, indium zinc oxide containing tungsten oxide, indium oxide containing titanium oxide, indium tin oxide containing titanium oxide, and the like, can be employed.

Embodiment 6

An RFID tag includes a semiconductor integrated circuit formed using a number of micro semiconductor elements; thus, malfunctions in the circuit or damages in the semiconductor element are easily caused by external electrostatic discharge (ESD). In particular, as a wireless tag and the like, antennas and the like that includes a conductor having a large surface area, have high possibility to cause the electrostatic discharge. In this embodiment, an example of a structure to protect the semiconductor integrated circuit from such electrostatic discharge is described.

FIGS. 10A to 10D illustrate examples of the structures. In this embodiment, the semiconductor integrated circuit is protected by providing a shield including a conductive material in the vicinity of the semiconductor integrated circuit.

Figure 10A:
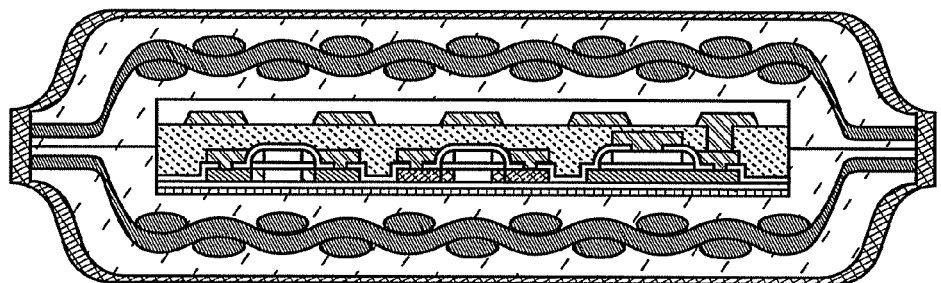
FIGS. 10A to 10D are diagrams showing an example of manufacturing process of an RFID tag.

FIG. 10A illustrates an example in which a shield 1001 is formed to entirely cover the exterior of the semiconductor integrated circuit chip. The shield 1001 may be formed to a thickness that does not prevent the antenna from receiving a carrier wave or an amplitude-modulated wave from a reader/writer as much as possible.

Note that the shield 1001 is formed so as to cover an upper surface, a lower surface, and side surfaces of the semiconductor integrated circuit chip in FIG. 10A. For the formation, after the shield is formed on the upper surface and part of the side surfaces, the semiconductor integrated circuit is turned over and the shield is formed on the lower surface and part of the side surfaces so as to cover the entire exterior.

Figure 10B:
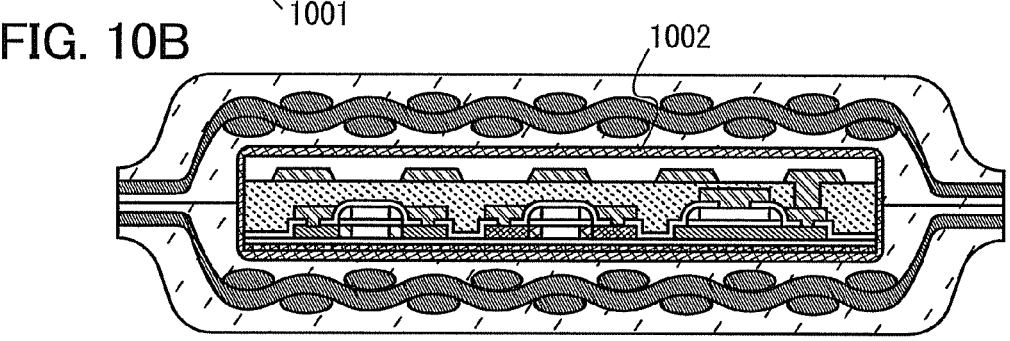

FIG. 10B illustrates an example in which a shield 1002 is formed inside the insulators to entirely cover the semiconductor integrated circuit. In order to form the shield 1002 so as to entirely cover the semiconductor integrated circuit as described above, each of the semiconductor integrated circuit chips needs to be separated and provided with the shield 1002 before the insulators are bonded to sandwich the semiconductor integrated circuit; however the semiconductor integrated circuit chip is not limited to this. For example, before the insulators are bonded to sandwich the semiconductor integrated circuit chip, a shield may be formed on an upper surface and a lower surface of the semiconductor integrated circuit. After the insulators are bonded to sandwich the semiconductor integrated circuit chip and laser light irradiation is performed to divide it, the shield is melted at the divided surface and side surfaces of the semiconductor integrated circuit may be covered with the welded shield from above and below.

Figure 10C:
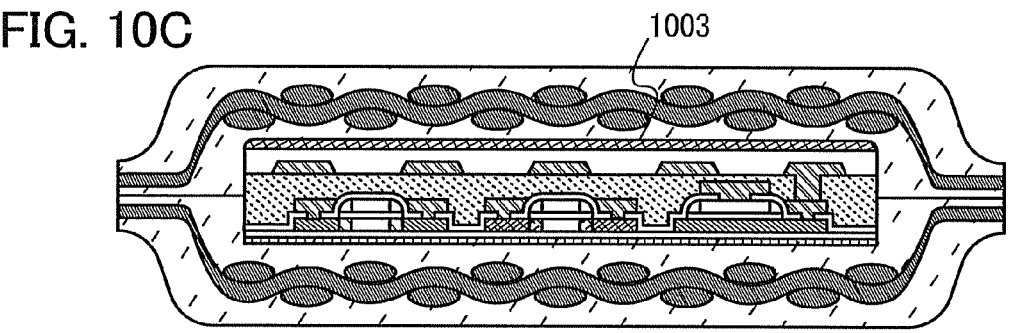

FIG. 10C illustrates an example in which a shield 1003 is formed inside the insulators and on one surface of the semiconductor integrated circuit. In this example, the shield 1003 is formed on the antenna side; however, it may be formed on the separation surface side.

By forming the shield only on one surface of the semiconductor integrated circuit, the antenna is not prevented by the shield from receiving a carrier wave or an amplitude modulation wave from a reader/writer, and a fine accuracy of communication can be achieved.

Figure 10D:
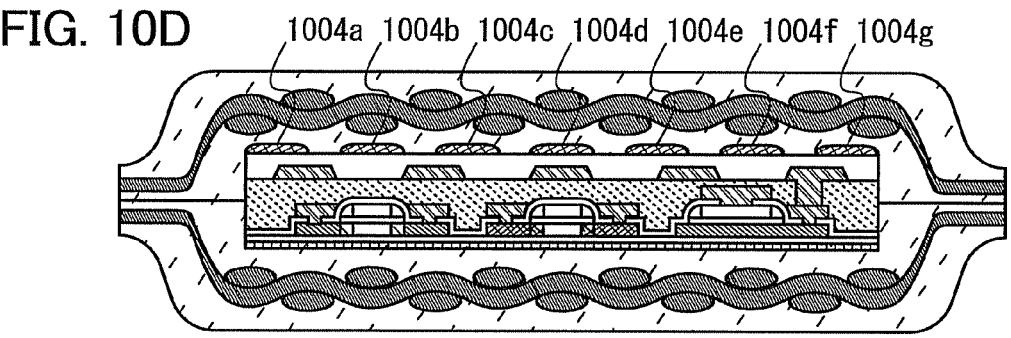

FIGS. 10A to 10C illustrate examples in which the shields are formed into a film form using a conductive material; however, the shield may be formed into an island form as shields 1004a to 1004g in FIG. 10D. Each of the shields 1004a to 1004g is formed with a conductive material and has conductivity; however, they are formed to be dotted about over the semiconductor integrated circuit. Since there is no continuity between the shields 1004a and 1004b, between the shields 1004c and 1004g, and the like, for example, the shields as a whole serve as an insulator although they are formed with a conductive material. In the case where the shields are formed to have such a structure, each of the shields 1004a to 1004g formed with a conductive material protects favorably the semiconductor integrated circuit from electrostatic discharge. In addition, the shields as a whole do not function as a conductive film, the antenna is not prevented by the shields from receiving a carrier wave or an amplitude-modulated wave from a reader/writer, and a fine accuracy of communication can be achieved.

The shield 1001 may preferably be formed with a conductor or semiconductor; thus, for example, a metal film, a metal oxide film, a semiconductor film, a metal nitride film, or the like can be given. Specifically, the shield 1001 may be formed with an element selected from: titanium (Ti), molybdenum (Mo), tungsten (W), aluminum (Al), copper (Cu), silver (Ag), gold (Au), nickel (Ni), platinum (Pt), palladium (Pd), iridium (Ir), rhodium (Rh), tantalum (Ta), cadmium (Cd), zinc (Zn), iron (Fe), silicon (Si), germanium (Ge), zirconium (Zr), and barium (Ba); an alloy material which contains any of these elements as its main component; a compound material, nitride material, or oxide material which contains any of these element as its main component; or the like.

As the nitride material, tantalum nitride, titanium nitride, or the like can be used.

As the oxide material, indium tin oxide (ITO), indium tin oxide containing silicon oxide (ITSO), organic indium, organic tin, zinc oxide, or the like can be used. Alternatively, indium zinc oxide (WO) containing zinc oxide (ZnO), zinc oxide (ZnO), zinc oxide containing gallium (Ga), tin oxide ($SnO_2$), indium oxide containing tungsten oxide, indium zinc oxide containing tungsten oxide, indium oxide containing titanium oxide, indium tin oxide (ITO) containing titanium oxide, or the like may be used.

Alternatively, a semiconductor film formed with a semiconductor to which an impurity element or the like is added to have conductivity, or the like can be used. For example, a polycrystalline silicon film doped with an impurity element such as phosphorus, or the like can be used.

Further alternatively, a conductive high molecule (also referred to as a conductive high molecule) may be used as the shield. A so-called π-electron conjugated conductive high molecule can be used as the conductive high molecule. For example, polyaniline and/or a derivative thereof, polypyrrole and/or a derivative thereof, polythiophene and/or a derivative thereof, a copolymer of two or more kinds of those materials, or the like can be used.

Specific examples of a conjugated conductive high molecule are given below: polypyrrole, poly(3-methylpyrrole), poly(3-butylpyrrole), poly(3-octylpyrrole), poly(3-decylpyrrole), poly(3,4-dimethylpyrrole), poly(3,4-dibutylpyrrole), poly(3-hydroxypyrrole), poly(3-methyl-4-hydroxypyrrole), poly(3-methoxypyrrole), poly(3-ethoxypyrrole), poly(3-octoxypyrrole), poly(3-carboxylpyrrole), poly(3-methyl-4-carboxylpyrrole), polyN-methylpyrrole, polythiophene, poly(3-methylthiophene), poly(3-butylthiophene), poly(3-octylthiophene), poly(3-decylthiophene), poly(3-dodecylthiophene), poly(3-methoxythiophene), poly(3-ethoxythiophene), poly(3-octoxythiophene), poly(3-carboxylthiophene), poly(3-methyl-4-carboxylthiophene), poly(3,4-ethylenedioxythiophene), polyaniline, poly(2-methylaniline), poly(2-octylaniline), poly(2-isobutylaniline), poly(3-isobutylaniline), poly(2-anilinesulfonic acid), or poly (3-anilinesulfonic acid).

An organic resin or a dopant (a halogen, a Lewis acid, an inorganic acid, an organic acid, a halide of a transition metal, an organic cyano compound, a nonionic surfactant, or the like) may be contained in the shield containing a conductive high molecule.

The shield can be formed by a variety of dry processes such as a sputtering method, a plasma CVD method, or an evaporation method; or a variety of wet processes such as a coating method, a printing method, or a droplet-discharge method (an ink jet method).

Embodiment 7

An applicable range of the RFID tag that is one embodiment of the present invention is wide, and the RFID tag can be applied to any product as long as it clarifies information of an object, such as the history thereof, without contact and is useful for production, management, or the like. For example, the RFID tag that is one embodiment of the present invention may be incorporated in bills, coins, securities, certificates, bearer bonds, packaging containers, documents, recording media, personal belongings, vehicles, groceries, garments, health products, daily commodities, medicines, and electronic devices. Examples of these products are described with reference to FIGS. 8A to 8G.

The bills and coins are money that circulates in the market, and includes one that can be used in the same way as money in a specific area (cash voucher), a commemorative coin, and the like. The securities refer to checks, certificates, promissory notes, and the like, which can be provided with an RFID tag 801 having a processor circuit (see FIG. 8A). The certificates refer to driver's licenses, certificates of residence, and the like, which can be provided with an RFID tag 802 having a processor circuit (see FIG. 8B). The personal belongings refer to bags, glasses, and the like, which can be provided with an RFID tag 803 having a processor circuit (see FIG. 8C). The bearer bonds refer to stamps, rice coupons, various merchandise coupons, and the like. The packing containers refer to wrapping paper for food containers and the like, plastic bottles, and the like, which can be provided with an RFID tag 804 having a processor circuit (see FIG. 8D). The documents refer to books and the like, which can be provided with an RFID tag 805 having a processor circuit (see FIG. 8E). The recording media refer to a DVD software, a video tape, and the like, which can be provided with an RFID tag 806 having a processor circuit (see FIG. 8F). The vehicles refer to wheeled vehicles such as bicycles, ships, and the like, which can be provided with an RFID tag 807 having a processor circuit (see FIG. 8G). The groceries refer to foods, beverages, and the like. The garments refer to clothes, shoes, and the like. The health products refer to a medical apparatus, a health appliance, and the like. The daily commodities refer to furniture, lighting apparatus, and the like. The medicines refer to a drug, an agricultural chemical, and the like. The electronic devices refer to a liquid crystal display device, an EL display device, television sets (a television receiver and a thin television receiver), a cellular phone, and the like.

The RFID tags can be provided by being attached to the surface of an article or being embedded in an article. For example, in the case of a book, the semiconductor device may be embedded in the paper; and in the case of a package made of an organic resin, the RFID tag may be embedded in the organic resin.

As described above, the efficiency of an inspection system, a system used in a rental shop, or the like can be improved by providing an RFID tag for the packing containers, the recording media, the personal belonging, the groceries, the garments, the daily commodities, the electronic devices, or the like. In addition, by providing an RFID tag for the vehicles, forgery or theft can be prevented. In addition, when the RFID tag is implanted into creatures such as animals, each creature can be identified easily. For example, by implanting/attaching an RFID tag with a sensor in/to a creature such as livestock, its health condition such as a current body temperature as well as its birth year, sex, breed, or the like can be easily managed.

This embodiment can be implemented in combination with any of the other embodiments.

This application is based on Japanese Patent Application serial no. 2008-258283 filed with Japan Patent Office on Oct. 3, 2008, the entire contents of which are hereby incorporated by reference.

What is claimed is:

1. An RFID tag comprising:
an antenna circuit for receiving an AC signal;
a first circuit for generating DC voltage for driving a logic circuit from the AC signal;
a second circuit for detecting an envelope from the AC signal;
a third circuit for detecting a potential difference between the DC voltage and reference voltage, wherein the third circuit is configured to output a potential corresponding to the potential difference;
a fourth circuit configured to change an impedance of the antenna circuit in accordance with the potential; and
a fifth circuit controlled by the envelope for selecting whether or not the potential output from the third circuit is input to the fourth circuit.

2. The RFID tag according to claim 1,
wherein the fourth circuit has a capacitor for changing the impedance of the antenna circuit.

3. The RFID tag according to claim 1,
wherein the fourth circuit has a resistor for changing the impedance of the antenna circuit.

4. An RFID tag comprising:
an antenna circuit for receiving an AC signal;
a first circuit for generating DC voltage for driving a logic circuit from the AC signal;
a second circuit for detecting an envelope from the AC signal;
a third circuit for shaping the envelope and outputting a pulse signal;
a fourth circuit for detecting a potential difference between the DC voltage and reference voltage, wherein the fourth circuit is configured to output a potential corresponding to the potential difference;
a fifth circuit configured to change an impedance of the antenna circuit in accordance with the potential; and
a sixth circuit controlled by the pulse signal for selecting whether or not the potential output from the fourth circuit is input to the fifth circuit.

5. The RFID tag according to claim 4,
wherein the fifth circuit has a capacitor for changing the impedance of the antenna circuit.

6. The RFID tag according to claim 4,
wherein the fifth circuit has a resistor for changing the impedance of the antenna circuit.

7. A driving method of an RFID tag comprising:
receiving an AC signal by an antenna circuit;
generating DC voltage from the AC signal for driving a logic circuit;
detecting an envelope from the AC signal;
detecting a potential difference between the DC voltage and reference voltage;
outputting a potential corresponding to the potential difference; and
changing an impedance of the antenna circuit by the potential difference controlled by the envelope.

8. A driving method of an RFID tag comprising:
receiving an AC signal by an antenna circuit;
generating DC voltage from the AC signal for driving a logic circuit;
detecting an envelope from the AC signal;
shaping the envelope and generating a pulse signal;
detecting a potential difference between the DC voltage and reference voltage;
outputting a potential corresponding to the potential difference; and
changing an impedance of the antenna circuit by the potential difference controlled by the pulse signal.

* * * * *